United States Patent
Gupta

(10) Patent No.: US 10,818,023 B2
(45) Date of Patent: Oct. 27, 2020

(54) SYSTEMS, METHODS, AND MEDIA FOR ENCODING STRUCTURED LIGHT IMAGING PATTERNS AND ESTIMATING DEPTHS IN A SCENE

(71) Applicant: Wisconsin Alumni Research Foundation, Madison, WI (US)

(72) Inventor: Mohit Gupta, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 97 days.

(21) Appl. No.: 16/112,474

(22) Filed: Aug. 24, 2018

(65) Prior Publication Data

US 2020/0065985 A1  Feb. 27, 2020

(51) Int. Cl.
*G06T 7/521* (2017.01)

(52) U.S. Cl.
CPC .... *G06T 7/521* (2017.01); *G06T 2207/10152* (2013.01)

(58) Field of Classification Search
CPC .. G02F 2001/134354; G09G 2320/028; H04N 13/156
USPC ............ 360/59, 245.3, 125.31; 348/335, 51; 345/633, 6; 349/96
See application file for complete search history.

(56) References Cited

U.S. PATENT DOCUMENTS

| | | | |
|---|---|---|---|
| 2,632,058 A | 3/1953 | Gray | |
| 2,823,345 A | 2/1958 | Ragland | |
| 10,282,857 B1 * | 5/2019 | Brailovskiy | ............. G06T 7/55 |
| 2015/0219944 A1 * | 8/2015 | Mitsumoto | ........... G02F 1/1339 349/138 |
| 2018/0095541 A1 * | 4/2018 | Gribetz | ................ G02B 27/017 |

OTHER PUBLICATIONS

Boyer, et al., Color-encoded structured light for rapid active ranging. IEEE Transactions on Pattern Analysis and Machine Intelligence PAMI-9(1) (1987) 14-28.

Carrihill, et al., Experiments with the intensity ratio depth sensor. Computer Vision, Graphics, and Image Processing 32 (3) (1985) 337-358.

Caspi, et al., Range imaging with adaptive color structured light. IEEE Trans. Pattern Anal. Mach. Intell. 20(5) (1998) 470-480.

(Continued)

*Primary Examiner* — Kiet M Doan
(74) *Attorney, Agent, or Firm* — Quarles & Brady LLP

(57) ABSTRACT

In accordance with some embodiments, systems, methods and media for encoding structured light imaging patterns and estimating depths in a scene are provided. In some embodiments, a system for estimating depths in a scene is provided, the system comprising: a light source; an image sensor; a hardware processor programmed to: cause the light source to emit K light patterns toward the scene, each of the K light patterns is different and includes a trapezoid-shaped wave, and at least one of the K light patterns includes at least two trapezoid-shaped waves; cause the image sensor to generate an intensity value during emission of each of the K light patterns such that the pixel is associated with at least K intensity values; determine a depth estimate for a portion of the scene imaged by the pixel based on the K intensity values associated with the pixel.

21 Claims, 15 Drawing Sheets

(56) References Cited

OTHER PUBLICATIONS

Chang, et al., On the (n,t)-Antipodal Gray Codes. Theoretical Computer Science 374(1-3) (2007).
Chen, et al., Modulated phase-shifting for 3D scanning. In: Proc. IEEE CVPR. (2008).
Chen, et al., Polarization and phase-shifting for 3D scanning of translucent objects. In: IEEE Proc. CVPR. (2007).
Couture, et al., Unstructured light scanning to overcome interreflections. In: Proc. IEEE ICCV. (2011).
Curless, et al., Better optical triangulation through spacetime analysis. In: Proceed-ings of IEEE International conference on Computer Vision. (1995).
Goddyn, et al., Binary gray codes with long bit runs. Electronic Journal of Com-binatorics 10 (2003).
Gotsman, et al., On the metric properties of discrete space-filling curves. IEEE TIP 5(5) (1996).
Gupta, et al., A practical approach to 3d scanning in the presence of interreflections, subsurface scattering and defocus. International Journal of Computer Vision 102(1) (2013) 33-55.
Gupta, et al., Micro Phase Shifting, 2012 IEEE Conference on Computer Vision and Pattern Recognition.
Gupta, et al., Structured light in sunlight. In: IEEE International Conference on Computer Vision. (2013).
Gupta, et al., What Are Optimal Coding Functions for Time-of-Flight Imaging? ACM Transactions on Graphics 37(2) (2018).
Gushov, et al., Automatic processing of fringe patterns in integer interferom-eters. Optics Lasers Engineering 14 (1991).
Hasinoff, et al., Noise-optimal capture for high dynamic range photography. In: Proc. IEEE CVPR. (2010).
Horn, Eli, et al. "Toward optimal structured light patterns." Image and Vision Computing 17.2 (1999): 87-97.
Horn, et al., Toward optimal structured light patterns. In: International Conference on Recent Advances in 3D Digital Imaging and Modeling. (1997).
Huang, et al., Trapezoidal phase-shifting method for threedimensional shape measurement. Optical Engineering 44 (12) (2005).
Kilian, et al., Antipodal Gray Codes. Discrete Mathematics 281(1-3) (2004).
Kim, et al., Antipodal gray codes for structured light. In: IEEE Internal Conference on Robotics and Automation (ICRA). (2008).
Koninckx, et al., Real-time range acquisition by adaptive structured light. IEEE Transactions on Pattern Analysis and Machine Intelligence 28(3) (2006) 432-445.
Mirdehghan, et al., Optimal structured light la carte. In: Proc. CVPR (2018).
Moreno, et al., Embedded phase shifting: Robust phase shifting with embedded signals. In: Proc. IEEE CVPR. (2015).
Nayar, et al., Fast separation of direct and global components of a scene using high frequency illumination. ACM Trans. Graph. 25(3) (2006).
O'Toole, et al., 3d shape and indirect appearance by structured light transport. In: Proc. IEEE CVPR. (2014).
Posdamer, et al., Surface measurement by space-encoded projected beam systems. Computer Graphics and Image Processing 18(1) (1982) 1-17.
Proesmans, et al., Active acquisition of 3d shape for moving objects. In: Proceedings of the International Conference on Image Processing. vol. 3.(1996) 647-650 vol. 3.
Proesmans, et al., One-shot active 3d shape acquisition. In: Proceedings of the International Conference on Pattern Recognition. vol. 3. (1996) 336-340 vol. 3.
Rosman, et al., Information-driven adaptive structured-light scanners. In: IEEE Conference on Computer Vision and Pattern Recognition. (2016).
Sagawa, et al., Dense 3d reconstruction method using a single pattern for fast moving object. In: Proc. IEEE ICCV. (2009) 1779-1786.
Salvi, et al., A state of the art in structured light patterns for surface profilometry. Pattern Recognition 43(8) (2010).
Srinivasan, et al., Automated phase-measuring profilometry: a phase mapping approach. Appl. Opt. 24(2) (1985) 185-188.
Towers, et al., Absolute fringe order calculation using optimised multi-frequency selection in full-field profilometry. Optics and Lasers in Engineering 43(7)(2005) 788-800.
Ulusoy, et al., One-shot scanning using de bruijn spaced grids. In: IEEE ICCV Workshops. (2009) 1786-1792.
Wang, et al., Maximum snr pattern strategy for phase shifting methods in structured light illumination. J. Opt. Soc. Am. A 27(9) (2010).
Xu, et al., An adaptive correspondence algorithm for modeling scenes with strong interreflections. IEEE Transactions on Visualization and Computer Graphics (2009).
Zhang, et al., Projection defocus analysis for scene capture and image display. ACM Trans. Graph. 25(3) (2006) 907-915.

* cited by examiner

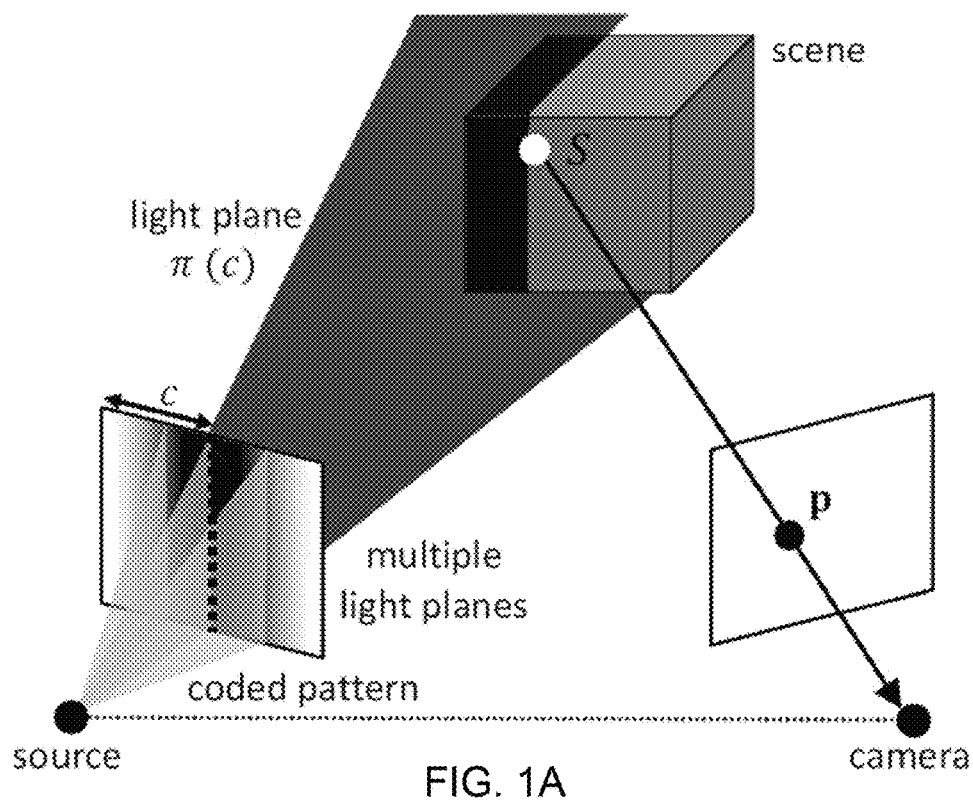
FIG. 1A
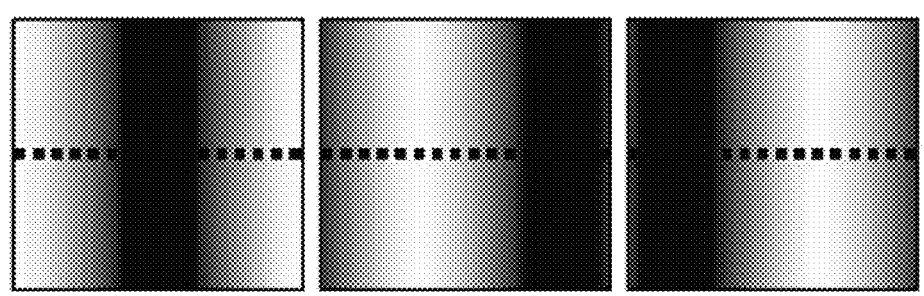
projected patterns
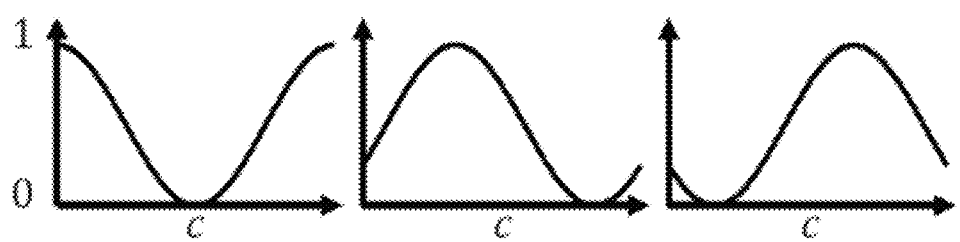
function intensity profiles
FIG. 1B space of unknowns space of measured intensities
(varying $c$, fixed $\alpha$ and $A$)

space of measured intensities
(varying $c$ and $\alpha$, fixed $A$)

space of measured intensities
(varying $c$, $\alpha$ and $A$)

Example Hamiltonian codes for $K = 4$

Example Hamiltonian codes for $K = 5$

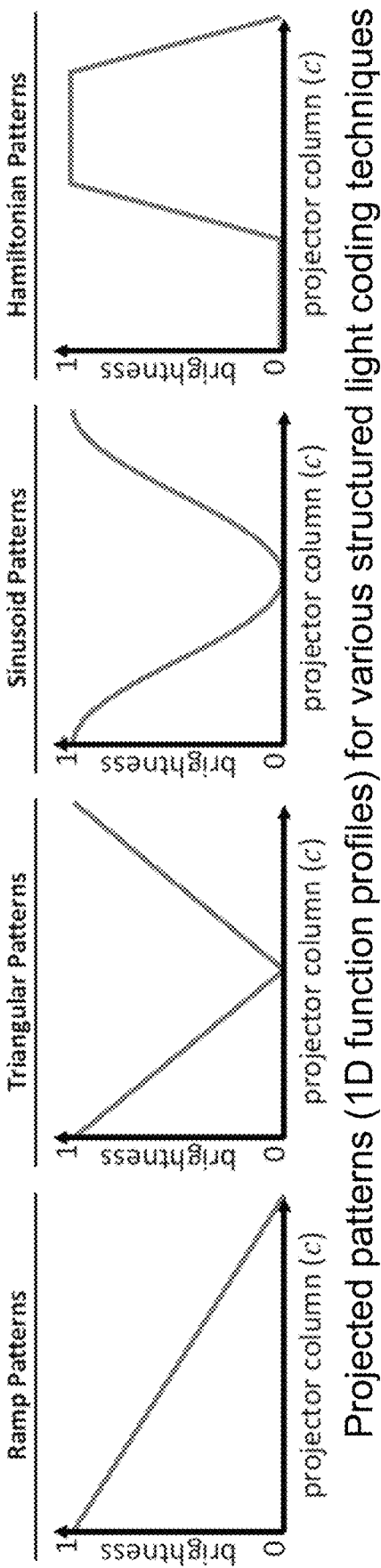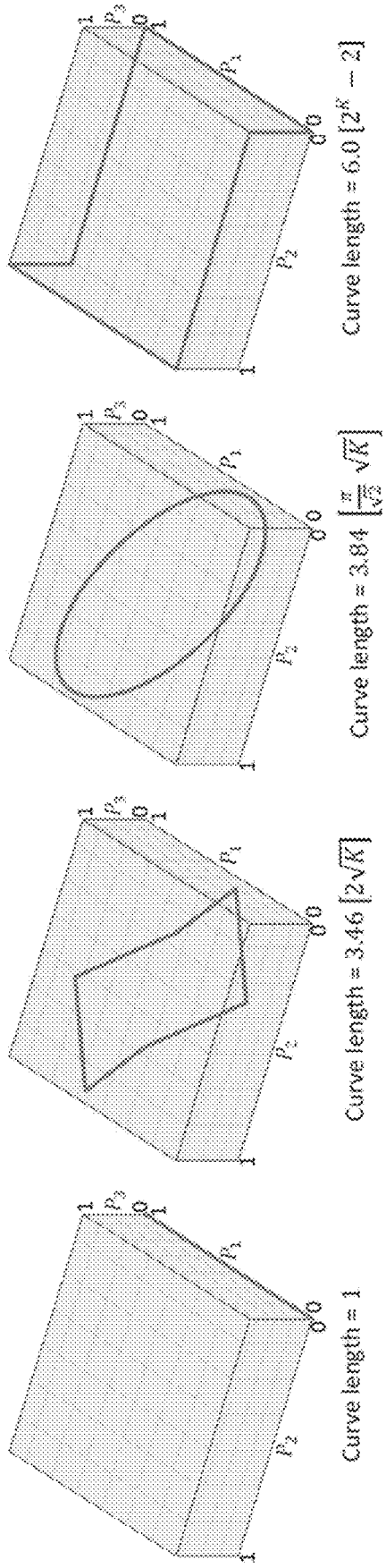
Projected patterns (1D function profiles) for various structured light coding techniques
Corresponding coding curves and curve lengths
FIG. 5A
FIG. 5B
FIG. 5C
FIG. 5D

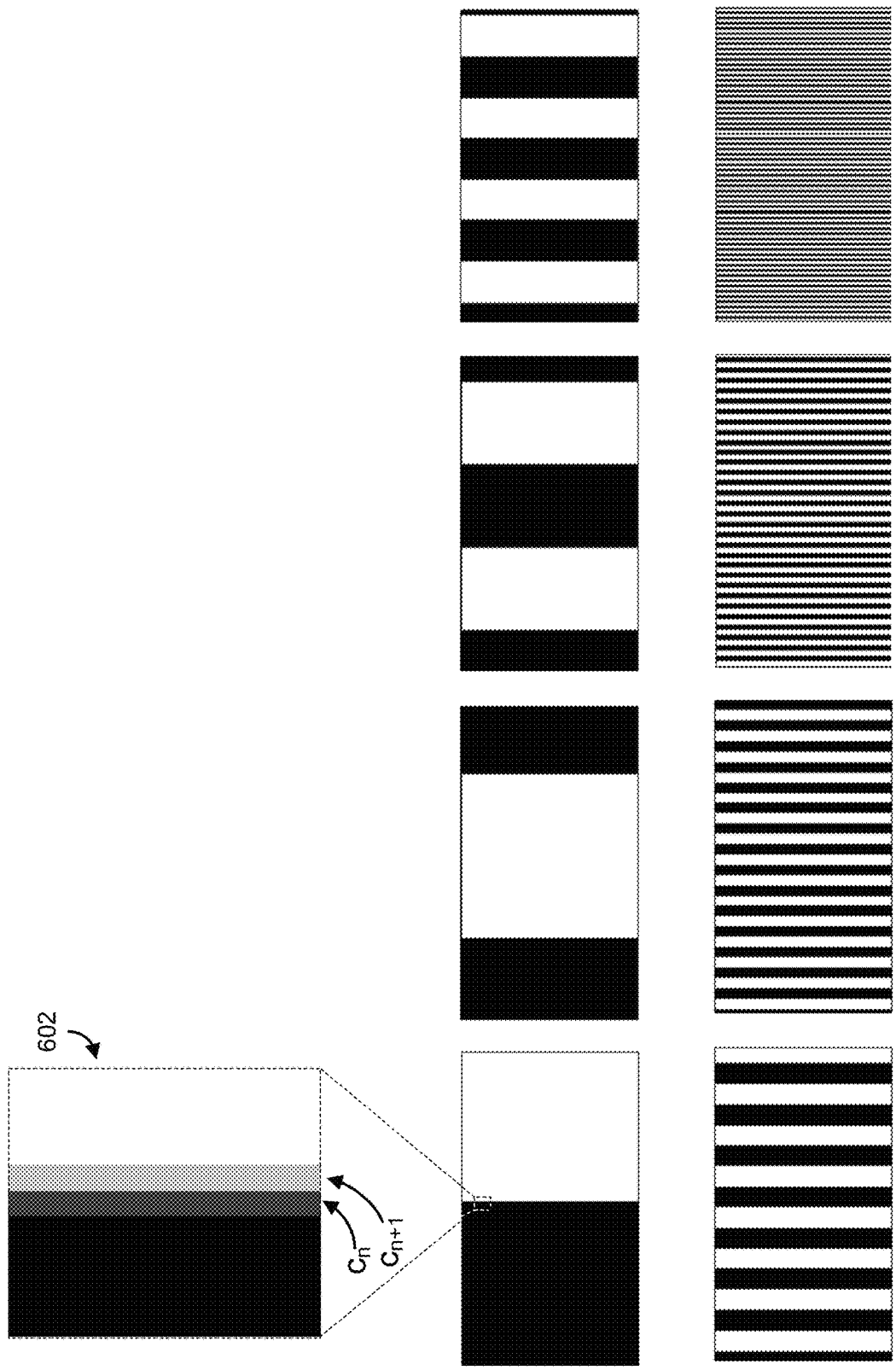
FIG. 6A Patterns for $K=8$ Reflected Hamiltonian coding

Patterns for K=8 Micro-Hamiltonian coding

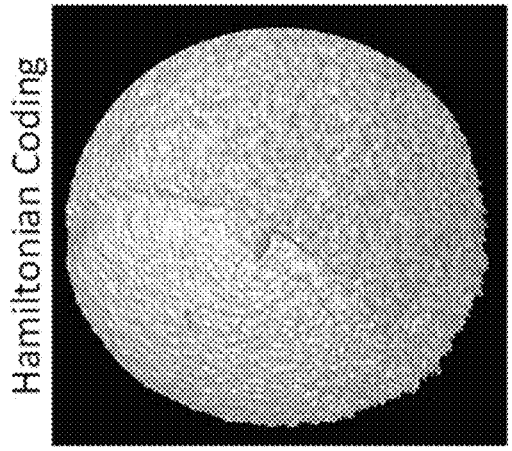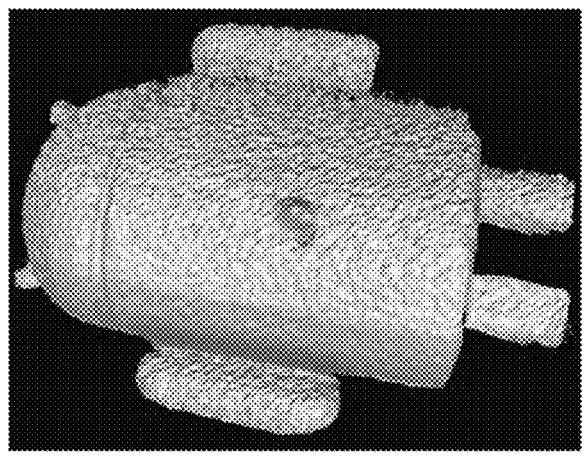
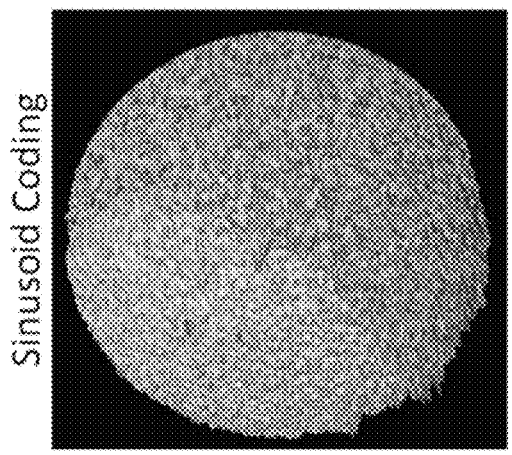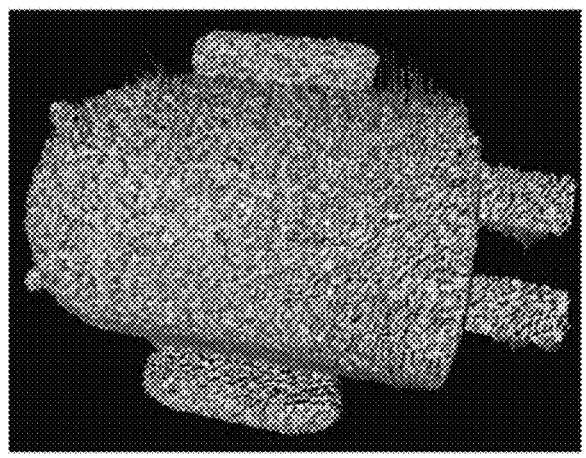
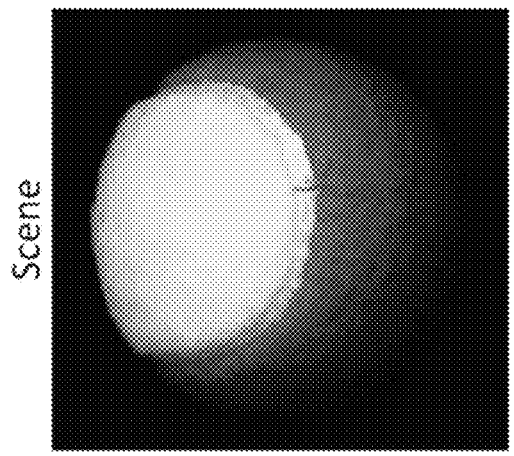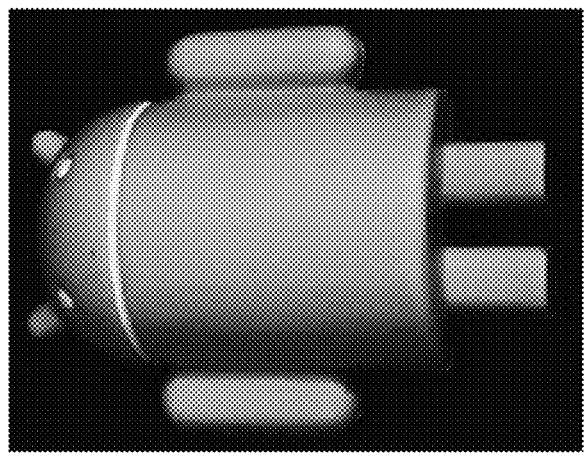
FIG. 9A    FIG. 9B    FIG. 9C

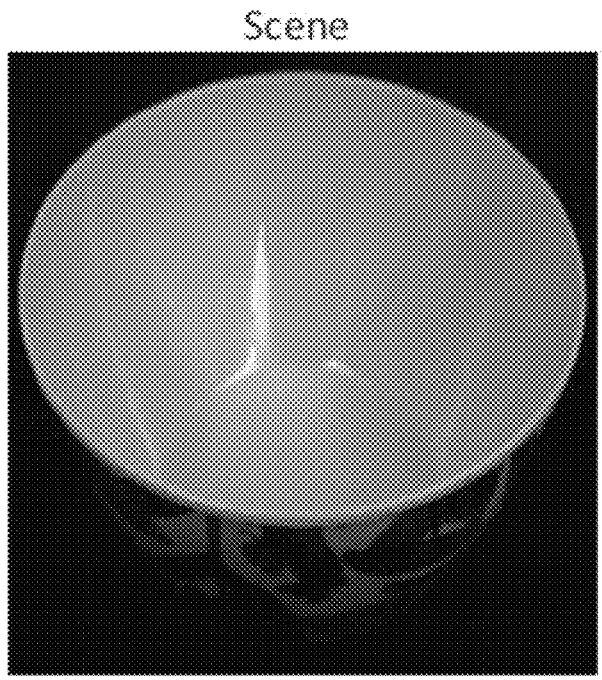
FIG. 11A  Scene
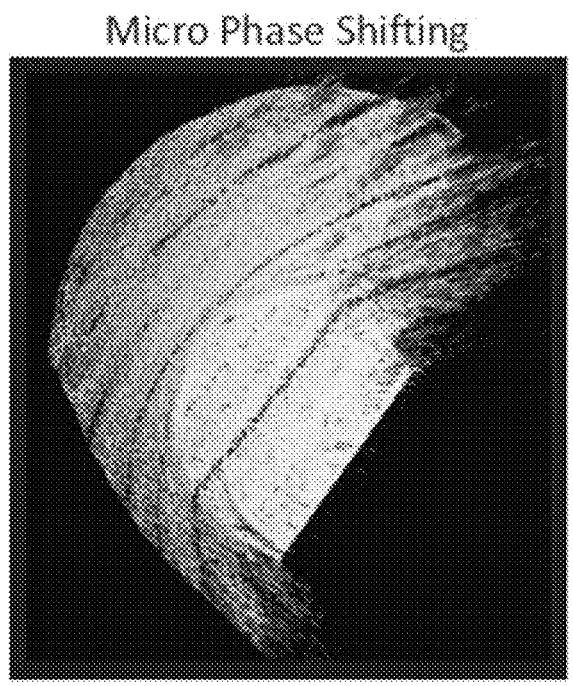
FIG. 11B  Micro Phase Shifting
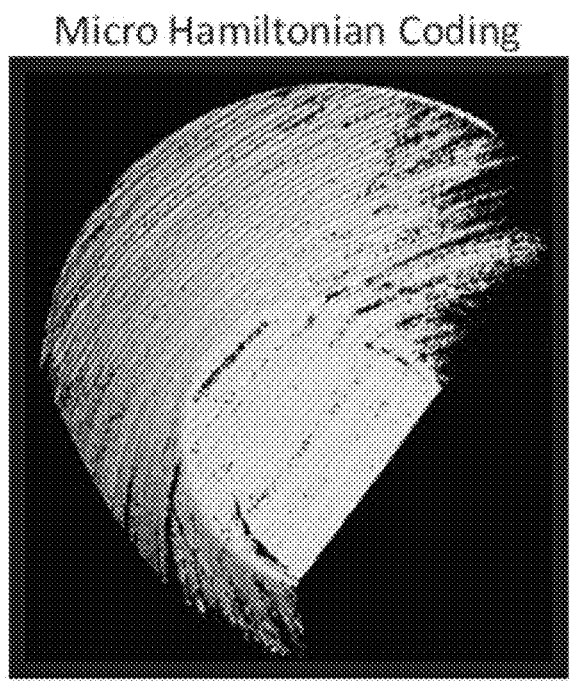
FIG. 11C  Micro Hamiltonian Coding
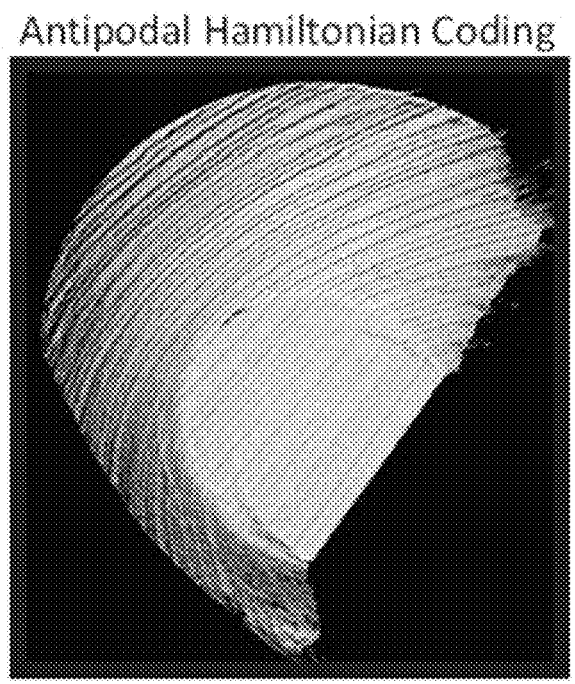
FIG. 11D  Antipodal Hamiltonian Coding

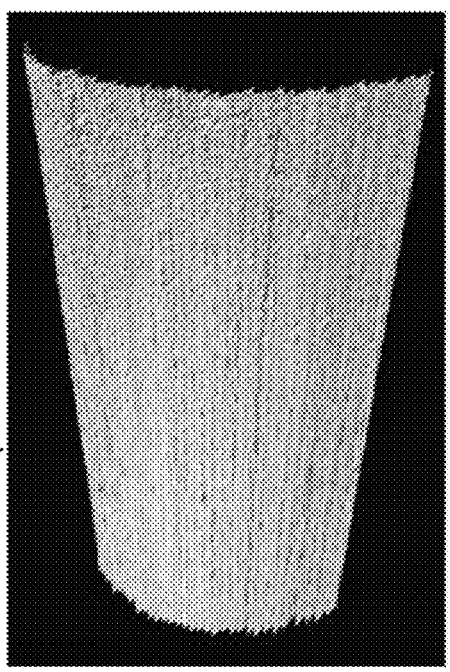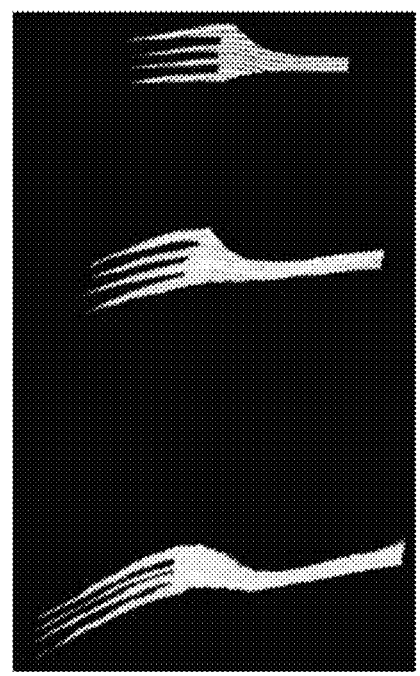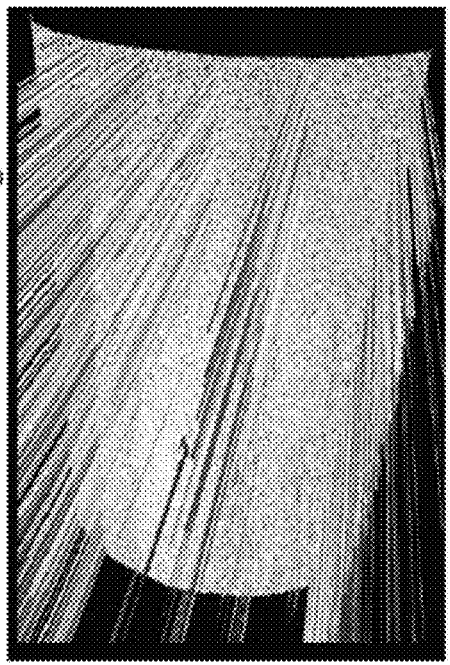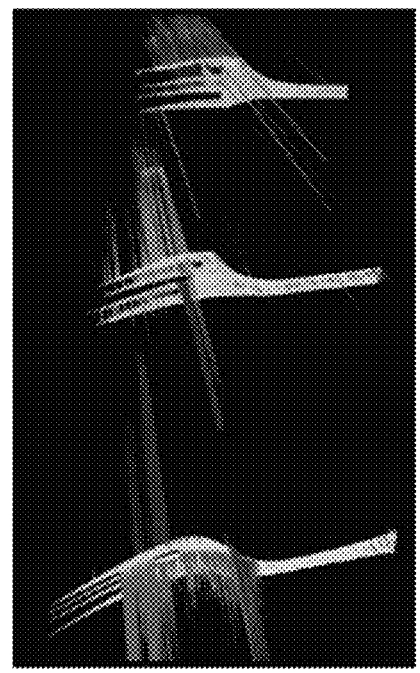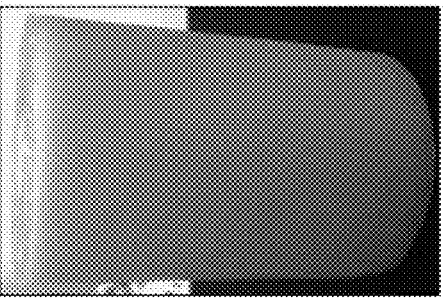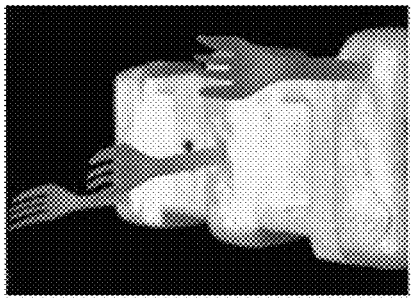
FIG. 12A        FIG. 12B        FIG. 12C

SYSTEMS, METHODS, AND MEDIA FOR ENCODING STRUCTURED LIGHT IMAGING PATTERNS AND ESTIMATING DEPTHS IN A SCENE

STATEMENT REGARDING FEDERALLY SPONSORED RESEARCH

This invention was made with government support under HR0011-16-C-0025 awarded by the DOD/DARPA and N00014-16-1-2995 awarded by the NAVY/ONR. The government has certain rights in the invention.

CROSS-REFERENCE TO RELATED APPLICATIONS

N/A

BACKGROUND

Structured light (SL) is a 3D imaging technique used in various applications, such as industrial automation, augmented reality, and robot navigation. Various SL techniques have been developed that can achieve various degrees of accuracy, and that require various amounts of time to carry out. For example, SL systems that use laser scanning SL techniques can recover 3D shape (e.g., the distance from the system to various points on the object) of one or more objects in a scene accurately (e.g., in the range of 10-100 microns in accuracy), but such systems typically require a large acquisition time. This limits the usefulness of such systems in many applications that require high precision and that also have limited acquisition time budgets, such as industrial inspection applications.

As another example, single-shot SL techniques can recover depths relatively quickly (e.g., using only a single image of the scene), but the depths that are recovered are spatially smoothed, resulting in a loss of detail (i.e., single-shot SL techniques are relatively low accuracy).

As yet another example, SL systems based on conventional multi-pattern SL techniques can recover depths relatively accurately under ideal conditions (i.e., with low levels of ambient light), but the accuracy of such systems degrades in more demanding conditions. Such conventional multi-pattern SL systems typically project a series of patterns toward the scene from a projector such that each projector column is assigned a unique temporal intensity code. In such an example, conventional multi-pattern SL systems can then use the codes to establish per-pixel correspondence for each camera pixel based on images of the scene captured while each pattern is projected. This can allow such conventional multi-pattern systems to achieve relatively high spatial resolution under certain conditions. However, the depth precision of conventional multi-pattern SL systems suffer in demanding scenarios (e.g., with small time budgets, in a low signal-to-noise ratio environment), and this can limit the usefulness of such systems for various 3D imaging applications in which the conditions cannot be controlled to be favorable to conventional multi-pattern SL.

In general, the depth precision of a multi-pattern SL system is related to the coding scheme (i.e., the set of patterns) used to project light toward the scene. While the problem of designing optimal patterns that achieve high depth precision has previously been recognized, finding a closed form (or even a numerical) solution has long been considered infeasible. Instead, a family of patterns based on intuitions from digital communications literature was developed. These patterns (e.g., designed using Hilbert space filling curves) belonged to the class of discrete coding schemes (i.e., intensities of the patterns are from a discrete set). While these patterns perform adequately in high signal-to-noise ratio (SNR) settings (e.g., with no ambient light, with large source power and/or long capture times), performance degrades as noise increases (e.g., as the amount of ambient light increases relative to source power).

Several different SL coding strategies have been proposed in the past, such as binary Gray coded patterns, color coding, ramp coding, sinusoid coding, trapezoid coding, and edge coding. Other SL techniques have been proposed for mitigating errors due to interreflections and scattering, and these techniques can be broadly categorized as optical approaches (e.g., based on polarization, or epipolar scanning), which require specialized hardware, and pattern coding approaches which involve designing patterns that are robust to global illumination (e.g., discrete binary patterns, or continuous sinusoid patterns).

While many SL techniques and coding strategies have been proposed, little progress has been made on analyzing the relative performance of different coding schemes analytically. Both designing optimal SL patterns, especially for low SNR scenarios, and tools for analyzing the performance of different SL techniques are desirable.

Accordingly, new systems, methods, and media for encoding structured light imaging patterns and estimating depths in a scene that are less likely to produce errors are desirable.

SUMMARY

In accordance with some embodiments of the disclosed subject matter, systems, methods, and media for encoding structured light imaging patterns and estimating depths in a scene are provided.

In accordance with some embodiments of the disclosed subject matter, a system for estimating depths in a scene is provided, the system comprising: a light source; an image sensor comprising a pixel; at least one hardware processor that is programmed to: cause the light source to emit K light patterns toward the scene, wherein each of the K light patterns includes at least one trapezoid-shaped wave and is different from each of the other K light patterns, and wherein at least one of the K light patterns includes at least two trapezoid-shaped waves; cause the image sensor to generate an intensity value during emission of each of the K light patterns such that the pixel is associated with at least K intensity values; determine a depth estimate for a portion of the scene imaged by the pixel based on the K intensity values associated with the pixel.

In some embodiments, $K \geq 4$.

In some embodiments, each of the K light patterns is based on a coding function, and wherein the K light patterns are based on a Hamiltonian cycle of a K-dimensional hypercube.

In some embodiments, the at least one hardware processor is further programmed to cause the light source to emit a first light pattern of the K light patterns by causing a first plurality of columns of the light source to emit light at a maximum intensity, and causing at least one column adjacent to the first plurality of columns to emit light at a fraction of the maximum intensity.

In some embodiments, the light source comprises a plurality of columns, each of the plurality of columns associated with a column index c, and wherein the plurality of columns is sub-divided into at least $2^K-4$ sub-intervals $\lambda$ such that in each sub-interval K−1 of the light patterns maintains a constant value over the columns in the sub-interval and one of the K patterns varies across the columns in the sub-interval.

In some embodiments, the at least one hardware processor is further programmed to determine a column index c' that is associated with a code corresponding to the K values associated with the pixel.

In some embodiments, the at least one hardware processor is further programmed to: identify a median value of the K values associated with the pixel; cluster K−1 of the K values associated with the pixel into a low intensity cluster, and a high intensity cluster; determine a sub-interval of the at least $2^K-4$ sub-intervals in which column index c' is located based on an order in which the K values were generated, and which of the K values is included in the low intensity cluster; and determine c' based on the sub-interval and the median value.

In some embodiments, the at least one hardware processor is further programmed to: determine a location K within the sub-interval based on the relationship $$\kappa = \frac{I_{med} - I_{min}}{I_{max} - I_{min}}$$

where $I_{med}$ is the median value, $I_{min}$ is a mean of values in the low intensity cluster, and $I_{max}$ is a mean of values in the high intensity cluster; and determine c' based on the location k.

In accordance with some embodiments of the disclosed subject matter, a method for estimating depths in a scene is provided, the method comprising: causing a light source to emit K light patterns toward the scene, wherein each of the K light patterns includes at least one trapezoid-shaped wave and is different from each of the other K light patterns, and wherein at least one of the K light patterns includes at least two trapezoid-shaped waves; causing an image sensor comprising a pixel to generate an intensity value during emission of each of the K light patterns such that the pixel is associated with at least K intensity values; determine a depth estimate for a portion of the scene imaged by the pixel based on the K intensity values associated with the pixel.

In accordance with some embodiments of the disclosed subject matter, a non-transitory computer readable medium containing computer executable instructions that, when executed by a processor, cause the processor to perform a method for estimating depths in a scene is provided, the method comprising: causing a light source to emit K light patterns toward the scene, wherein each of the K light patterns includes at least one trapezoid-shaped wave and is different from each of the other K light patterns, and wherein at least one of the K light patterns includes at least two trapezoid-shaped waves; causing an image sensor comprising a pixel to generate an intensity value during emission of each of the K light patterns such that the pixel is associated with at least K intensity values; determine a depth estimate for a portion of the scene imaged by the pixel based on the K intensity values associated with the pixel.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1A shows an example representation of a structured light imaging system using a continuous coding scheme to project a pattern of light planes toward a scene.

FIG. 1B shows an example of projector patterns and corresponding function intensity profiles for a continuous sinusoid-based structured light coding scheme.

FIG. 5A shows an example of a ramp-based pattern and its coding curve shown as a geometrical representation in three dimensional space.

FIG. 5B shows an example of a triangle-based pattern and its coding curve shown as a geometrical representation in three dimensional space.

FIG. 5C shows an example of a sinusoid-based pattern and its coding curve shown as a geometrical representation in three dimensional space.

FIG. 5D shows an example of a Hamiltonian-based pattern and its coding curve shown as a geometrical representation in three dimensional space.

FIG. 6A shows an example of projector intensity patterns as a function of column index for an eight pattern Hamiltonian coding scheme for structured light imaging in accordance with some embodiments of the disclosed subject matter.

FIG. 9A shows examples of two scenes measured using structured light imaging techniques with a four pattern sinusoid-based coding scheme and a four pattern Hamiltonian-based coding scheme.

FIG. 9B shows examples of depth values calculated for the scenes in FIG. 9A using the four pattern sinusoid-based coding scheme mapped as three dimensional surfaces.

FIG. 9C shows examples of depth values calculated for the scenes in FIG. 9A using the four pattern Hamiltonian-based coding scheme mapped as three dimensional surfaces.

FIG. 11A shows an example of a scene with interreflections measured using structured light imaging techniques with a micro phase shifting-based coding scheme, a micro Hamiltonian-based coding scheme, and an antipodal Hamiltonian-based coding scheme.

FIG. 11B shows an example of depth values calculated for the scene in FIG. 11A using the micro phase shifting-based coding scheme mapped as a three dimensional surface.

FIG. 11C shows an example of depth values calculated for the scene in FIG. 11A using the micro Hamiltonian-based coding scheme mapped as a three dimensional surface.

FIG. 11D shows an example of depth values calculated for the scene in FIG. 11A using the antipodal Hamiltonian-based coding scheme mapped as a three dimensional surface.

FIG. 12A shows an example of scenes with defocus due to subsurface scattering and a large depth range, respectively, measured using structured light imaging techniques with a micro phase shifting-based coding scheme, and an antipodal Hamiltonian-based coding scheme.

FIG. 12B shows an example of depth values calculated for the scenes in FIG. 12A using the micro phase shifting-based coding scheme mapped as a three dimensional surface.

FIG. 12C shows an example of depth values calculated for the scenes in FIG. 12A using the antipodal Hamiltonian-based coding scheme mapped as a three dimensional surface.

DETAILED DESCRIPTION

Figure 2A:
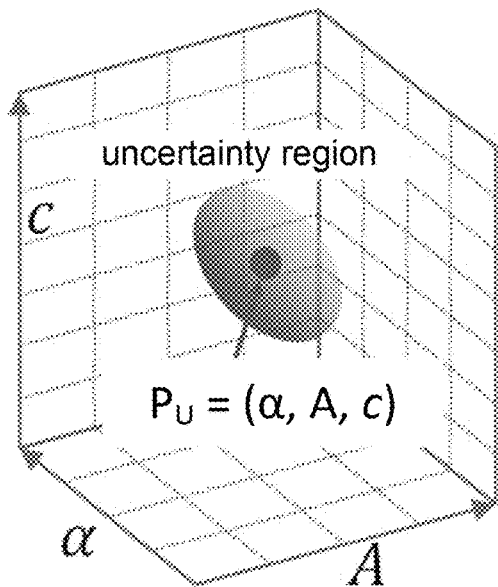
FIG. 2A shows an example of a point plotted in a space of unknown parameters.

In accordance with various embodiments, mechanisms (which can, for example, include systems, methods, and media) for encoding structured light imaging patterns and estimating depths in a scene are provided.

In some embodiments of the subject matter disclosed herein, SL systems can estimate depth in a scene (e.g., as distances to various points in the scene) based on patterns of light detected in different images of the scene captured as different patterns of light are projected toward the scene. For example, multiple patterns can be successively projected toward the scene, with the patterns encoding positions along one or more directions. In some embodiments, the mechanisms described herein can project patterns that are robust to noise to increase the accuracy of SL imaging, such as patterns based on Hamiltonian coding curves, which can be evaluated using techniques described herein for analyzing SL coding techniques. As described below, SL coding schemes can be characterized by an image formation equation that can be used to calculate a metric based on the geometry of SL coding schemes that can be used to analytically predict the performance of various SL coding schemes. Additionally, a surrogate metric is described that is based on a first order differential analysis of the image formation equation that is relatively easy to compute can be used to evaluate the performance of various SL coding schemes.

As described below, in some embodiments, the mechanisms described herein can be used to implement Hamiltonian coding schemes that can produce higher precision than conventional SL approaches (e.g., by roughly an order of magnitude), especially in low SNR scenarios (e.g., where there is a strong ambient light source), while requiring a relatively small number of images (e.g., as few as three). Note that conventional discrete coding techniques for SL imaging generally require relatively large numbers of images (e.g., proportional to the log of the number of columns). In some embodiments, continuous Hamiltonian coding schemes can be implemented using high frequency patterns that are robust to a broad range of global illumination. As described below, Hamiltonian codes implemented in accordance with some embodiments of the disclosed subject matter can outperform various conventional approaches, and more recently proposed coding schemes that were specifically designed for applications in which global illumination (i.e., relatively bright ambient light) cannot be avoided.

In some embodiments, the mechanisms described herein can be used to adapt existing hardware to more accurately detect depths in a scene. For example, the mechanisms described herein can be used to configure an existing SL imaging device to use a Hamiltonian coding scheme (e.g., rather than a sinusoid-based coding scheme) with the same light source and image sensor. Additionally, in some embodiments, the mechanisms described herein can be used in conjunction with other approaches for increasing SL imaging accuracy that do not rely on a particular types of patterns. For example, the mechanisms described herein can be used in conjunction with optical approaches for increasing SL imaging accuracy (e.g., SL transport techniques).

FIG. 1A shows an example representation of a structured light imaging system using a continuous coding scheme to project a pattern of light planes toward a scene. As shown in FIG. 1A, a SL imaging system can include a projector and a camera, with the projector projecting one or more intensity patterns toward the scene and the camera capturing an image for each pattern. For example, single-shot techniques capture a single image of a single pattern, and assume that scene depths are locally smooth, resulting in loss of fine geometric details. As another example, multi-shot techniques involve projecting several patterns, and computing on a per-pixel basis. Multi-shot SL imaging systems can use patterns which can be expressed as a 1D coding function, with all the pixels positions within a particular column (or row) of the projector having the same intensity. In such an example, the projector can be modeled as emitting several light planes, one from each column (or row), as shown in FIG. 1A. In such an example, in order to compute depth at a camera pixel, the light plane that illuminates the scene point imaged by the pixel can be identified based on a unique intensity code assigned to every column. In such an example, the length of the code can be the number of projected patterns. In a more particular example, the intensity code can be binary with each column having two intensity values (e.g., a first intensity value in a first pattern, and a second intensity value in a second pattern). Note that although the intensity code may be binary, the intensity value of each column is not limited to a binary intensity and the two intensity values can be any suitable value between 0 (e.g., no light projection) and 1 (e.g., maximum intensity projection). As another more particular example, the intensity code can be N-ary with each column having N discrete intensity values that can be identified to determine the identity of the column (e.g., the column index of the column). Binary and N-ary coding belong to the class of discrete coding methods, where the coding function takes only discrete values. These methods assume that the light source emits a discrete set of light planes. The number of possible depth values at a camera pixel is bounded by the number of light planes. Thus, the depth resolution achieved by a discrete coding method is limited.

FIG. 1B shows an example of projector patterns and corresponding function intensity profiles for a continuous sinusoid-based structured light coding scheme. In general, continuous SL coding schemes are based on coding functions that are continuous and piece-wise differentiable functions. As shown in FIG. 1B, a sinusoid phase-shifting scheme, one of the most widely used SL techniques, is a continuous coding scheme in which the 1D coding functions are sinusoids that are offset in phase across the column index c. Due to a continuum of light planes, continuous techniques are capable of achieving significantly higher depth resolution as compared to discrete methods. Note that, while continuous coding schemes can theoretically achieve infinite depth resolution (due to the continuous functions representing an infinite number of light planes), the finite resolution and dynamic range of the camera, finite numerical precision, and image noise place practical limits on the achievable resolution.

The number of projected patterns (and captured images) in a coding scheme can be represented by a value K, with each if the K projected patterns represented by a 1D coding function $P_i(c)$, $1 \leq i \leq K$, where c ($1 \leq c \leq N_c$) is the projector column index, and $N_c$ is the total number of columns in the projector. The functions can be normalized so that $0 \leq P_i(c) \leq 1$. Considering a scene point S that is illuminated by column number c and imaged at camera pixel p, the intensities received at pixel p can be represented as:

$$I_i(p) = \alpha(p,c)P_i(c) + A(p), \quad (1)$$

where a(p, c) is an albedo term, and A(p) is an ambient illumination term. For example, $\alpha(p, c)$ can be defined as the image brightness received at p if column c emits unit intensity (e.g., a normalized intensity of 1). As another example, A(p) can be defined as the image brightness at p due to light sources other than the projector. In general, both $\alpha(p, c)$ and A(p) are unknown, along with the column correspondence c. Accordingly, the space of unknowns can be represented as a 3D space with the axes corresponding to column index c, albedo $\alpha(p, c)$, and ambient illumination A(p) which is shown in FIG. 2A.

Figure 2B:
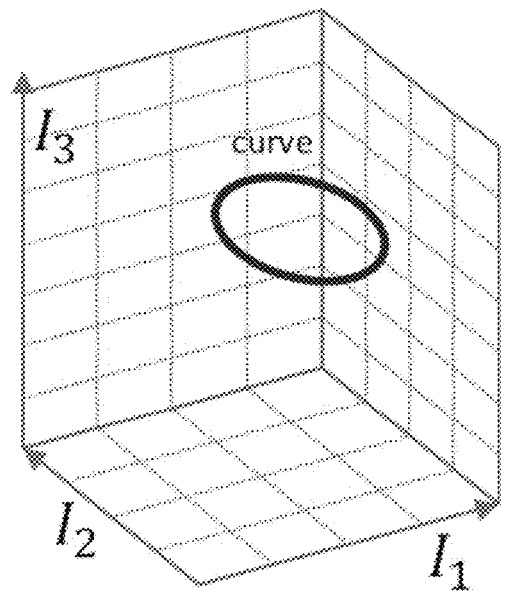
FIG. 2B shows an example of a curve to which the point in FIG. 2A can be mapped in a space of measured intensities with varying column index correspondence.

FIG. 2B shows an example of a curve to which the point in FIG. 2A can be mapped in a space of measured intensities with varying column index correspondence. In general, a structured light coding scheme can be defined by the coding functions $[P_1, \ldots, P_K]$, which maps a point $P_U = [\alpha, A, c]$ in the unknown space to a point $P_I = [I_1, \ldots, I_K]$ in a K-dimensional space of measured intensities. For example, consider the 1D set of unknown points, for fixed values of a and A, but varying correspondence c (e.g., which can be graphed as a line segment in the space of FIG. 2A at a constant $\alpha$ and constant A). As shown in FIG. 2B, a sinusoid-based coding scheme for K=3 can map this set of unknown points to a 1D set of points which form a circle in the measurement space (i.e., in general a circle is a 1D shape that can be described using only a single dimension, although in this case it is tilted with respect to the intensity axes). Note that although the unknown points only vary along a single axis in the space of FIG. 2A, the circle in FIG. 2B is tilted with respect to all three axes. Note that the axes are labeled for convenience, and the space of measured intensities can be oriented in other ways.

Figure 2C:
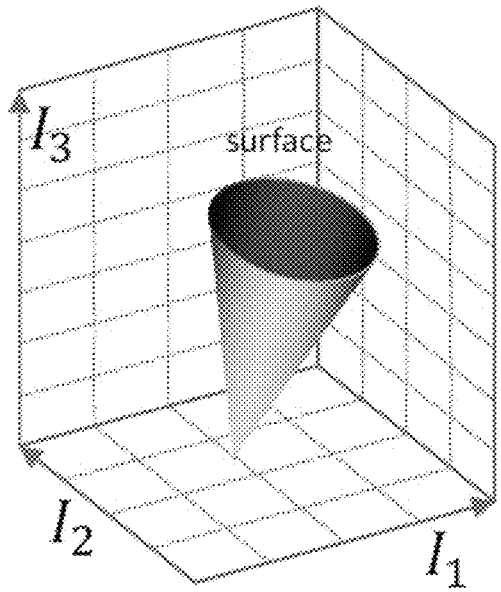
FIG. 2C shows an example of a surface to which the point in FIG. 2A can be mapped in a space of measured intensities with varying column index and albedo.

FIG. 2C shows an example of a surface to which the point in FIG. 2A can be mapped in a space of measured intensities with varying column index and albedo. As shown in FIG. 2C, a 2D set of unknowns in which where both c and a are varied (e.g., which can be graphed as a portion of a plane in the space of FIG. 2A at a constant A) are mapped to a 2D set of points forming a hollow cone. As shown in FIG. 2C, as the albedo decreases, the measured intensities can decrease proportionally forming circles of decreasing radii to form the cone shown in FIG. 2C.

Figure 2D:
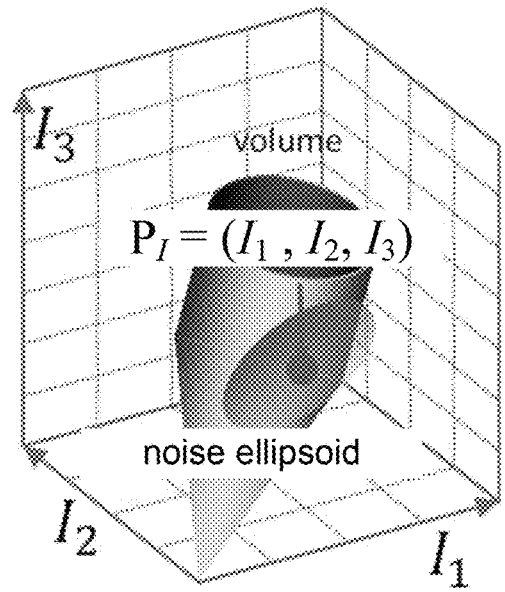
FIG. 2D shows an example of a volume to which the point in FIG. 2A can be mapped in a space of measured intensities with varying column index, albedo, and ambient light.

FIG. 2D shows an example of a volume to which the point in FIG. 2A can be mapped in a space of measured intensities with varying column index, albedo, and ambient light. As shown in FIG. 2D, a 3D set of unknowns in which each of $\alpha$, A, and c vary (e.g., which can be graphed as a 3D set of unknowns as shown in FIG. 2A) can be mapped to a 3D volume of points, formed by extruding the cone along a line segment.

Note that the geometries discussed above in FIGS. 2B through 2D represent the true intensities that can result from the unknown points, and that the measured intensity at any given pixel may lie outside of these geometries (e.g., due to the contribution of various sources of noise, such as noise generated within the camera). For example, $I_i$ can represent the true intensity measurement for pattern $P_i$ at a pixel p. In such an example, the actual measured intensity $I'_i$, including noise, can be represented as:

$$\hat{I}_i = I_i + v_i, \quad (2)$$

where $v_i$ is the noise in the intensity measurement $I_i$, including both read noise and photon noise. Accordingly, the point $P_{I'} = [I'_1, \ldots, I'_K]$ representing the vector of actual measured intensities can lie outside of the space of possible true intensities (e.g., as shown by the noise ellipsoid in FIG. 2D).

In some embodiments, the effect of noise can be taken into account when calculating a depth value based on measured intensities for each of the K patterns in a coding scheme. For example, given the actual intensities $P_{I'} = [I'_1, \ldots, I'_K]$ measured at a camera pixel, projector correspondence can be computed by a decoding function, which is an inverse mapping from the measurement space to the unknown space. Due to the randomness associated with the measurements $P_{I'}$, the decoded unknown point can be modeled as a random variable, whose distribution is denoted with an uncertainty region, shown in FIG. 2A. Note that although the uncertainty region is shown as an ellipsoid in FIG. 2A, the shape of the uncertainty region depends on the coding and decoding functions. Due to this uncertainty, the decoding algorithm can compute an inaccurate correspondence c'. This uncertainty can place fundamental limits on the achievable depth resolution for a particular coding scheme. For example, if the error in the computed correspondence is represented as $\Delta c=|c'-c|$, given a coding scheme and a decoding function, the expected correspondence error $E(\Delta c)$, averaged over the entire space of unknowns, can be represented as:

$$E(\Delta c) \propto \int_{P_U} \int_{P_I} |c'-c| p(P_I) dP_I dP_U, \quad (3)$$

where c' and c are the estimated and true projector correspondence values for measured intensities $P_I$, $p(P_I) \sim N(P_I, \Sigma)$ is the Gaussian probability distribution function (illustrated as noise ellipsoid in FIG. 2D) of $P_I$, with the true intensity point $P_I$ as the mean, noise covariance $\Sigma_I$, and $p(P_I)$ representing the measured intensity at pixel p, including a noise component. In such an example, the double integral can be taken over the unknown space and the measurement space As described above in connection with EQ. (3), depth error is proportional to correspondence error, and accordingly an optimal structured light coding scheme can be defined as the one that minimizes the expected correspondence error $E(\Delta c)$. However, the form of $E(\Delta c)$ makes it difficult to optimize analytically, and is also relatively computationally intensive to compute numerically. Additionally, because any optimization must be performed in the high-dimensional space of coding functions, this increases the complexity of any optimization. However, in some embodiments, a surrogate objective function can be used to perform an optimization based on a surrogate metric. This surrogate metric can be calculated based on a first order differential analysis of the image formation equation represented as EQ. (1). The surrogate metric can be defined in terms of the coding curve that serves as a geometric representation of a structured light coding scheme. For example, for a structured light coding scheme represented by patterns $P_i$, $1 \leq i \leq K$, the coding curve for this scheme can be the set of points $[P_1(c), \ldots, P_K(c)]$ in the K-dimensional space, as the projector column index c is varied. In a more particular example, the coding curve of a sinusoid-based coding scheme is a circle in K-dimensional space (as shown in FIG. 5C). Given a coding scheme, if $\Lambda$ represents the length of the corresponding coding curve, a surrogate metric $\gamma$ can be represented as:

$$\gamma \propto \frac{\varsigma}{\alpha_{mean} \Lambda}, \quad (4)$$

where $\varsigma$ is the maximum standard deviation of measurement noise, and $\alpha_{mean}$ is the mean albedo term over the space of unknowns.

In general, it would be expected that because a longer coding curve spreads the measurement points further apart in the measurement space, it would result in lower decoding errors due to noise. The structure of EQ. (4) indicates that this expectation is generally correct, and provides an approximate, but analytical expression for the performance of SL coding schemes in terms of coding curve length. Accordingly, given a structured light coding scheme, its coding curve length $\Lambda$ can be used as a surrogate that can be a relatively efficient technique for describing the schemes geometric properties. Additionally, given system dependent constant $\varsigma$, and a mean scene albedo $\alpha_{mean}$, $\gamma$ is, in general, approximately proportional to the expected correspondence error $E(\Delta c)$ (note that an exception to this general proportionality is if the coding curve is not distance preserving). In some embodiments, the coding curve length $\Lambda$ can be used as a metric for evaluating SL coding schemes and/or designing high performance SL coding schemes. For example, if a coding scheme has a longer coding curve length, a lower expected correspondence error can be expected, which correlates with a higher expected depth resolution.

Figure 2E:
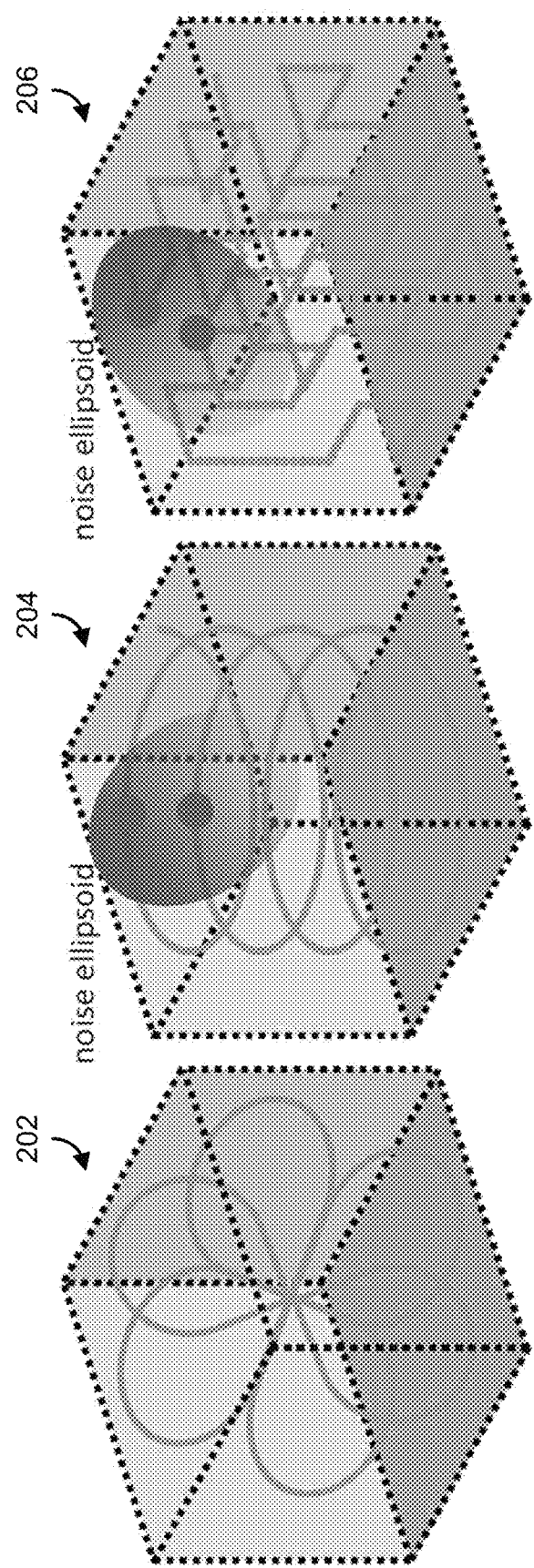
FIG. 2E shows examples of coding curves representing SL coding schemes that are not well suited to producing high depth resolution.

FIG. 2E shows examples of coding curves representing SL coding schemes that are not well suited to producing high depth resolution. As described above in connection with FIGS. 2A to 2D, in general SL coding schemes with long coding curves can achieve high depth resolution. However, some long schemes with long coding curves are not suitable for use with a SL imaging system and/or would introduce potential sources of errors that would at least somewhat negate any advantage gained from the length of the codding curve. For example, FIG. 2E includes a first curve 202 that is long, but self-intersecting, which prevents curve 202 from defining a unique mapping from projector correspondences to captured intensities, and thus, does not represent a valid SL coding scheme. As another example, FIG. 2E includes a second curve 204 (a helix) and a third curve 206 (a Hilbert space-filing curve) that are each long, and non self-intersecting. However, curves 204 and 206 have poor distance preserving properties, due to the presence of points on the curve that are distant along the curve, but close in the Euclidean distance sense within the coding curve space (e.g., two points that are relatively far apart along the curve but with a Euclidean distance that is less than the long axis of the noise ellipsoid, as shown in connection with curves 204 and 206). Due to the closeness in Euclidean distance, using these curves may result in large depth errors even for small amounts of noise, as the measured intensities may correspond to a portion of the curve that is a large distance along the curve (and therefore represents a large difference in scene depth). While coding schemes based on these curves may be capable of achieving high performance in low noise settings, the performance is likely to rapidly deteriorate when moderate to high amounts of noise are present in the SL imaging system. Accordingly, coding curves that are well suited to producing high depth precision in less than optimal conditions can be characterized as relatively long, non self-intersecting, and distance preserving. As described below in connection with FIGS. 4A, 4B and 5D, a family of curves that can be characterized with these properties are Hamiltonian cycles on hypercube graphs. For example, as shown in FIG. 5D, a graph formed by the vertices and edges of a K-dimensional intensity space hypercube includes 2×K corners, and a path that visits all of the 2×K corners of the hypercube traverses a relatively long distance (e.g., compare to a coding curve of a sinusoid-based coding scheme), non self-intersecting, and distance preserving (i.e., points that are distant along the curve are also distant within the intensity space.

Figure 3:
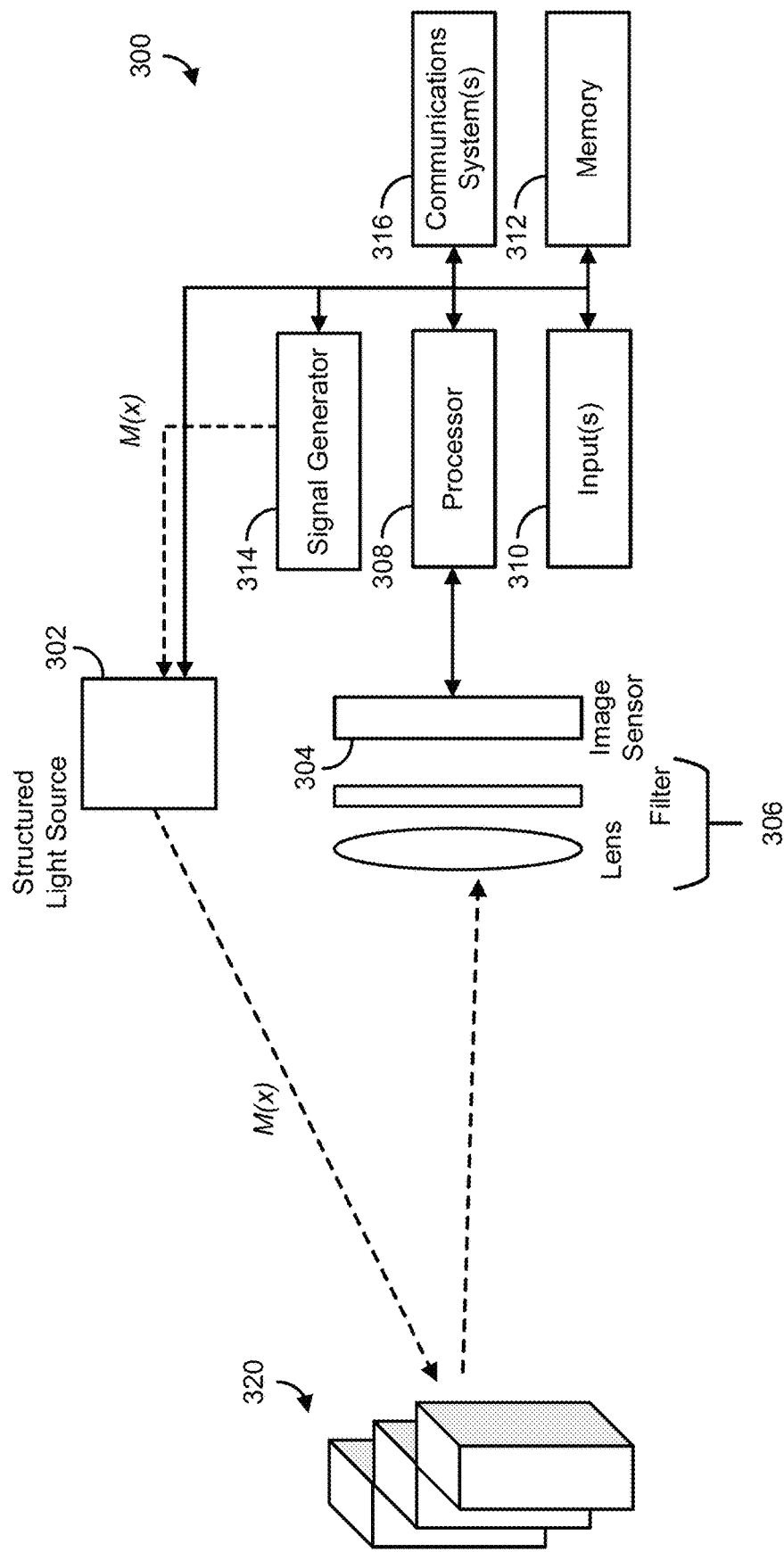
FIG. 3 shows an example of a system for encoding structured light imaging patterns and estimating depths in a scene is shown in accordance with some embodiments of the disclosed subject matter.

Turning to FIG. 3, an example 300 of a system for encoding structured light imaging patterns and estimating depths in a scene is shown in accordance with some embodiments of the disclosed subject matter. As shown, system 300 can include a structured light source 302; an image sensor 304; optics 306 (which can include, for example, a lens, a filter, etc.); a processor 308 for controlling operations of system 300 which can include any suitable hardware processor (e.g., a microprocessor, digital signal processor, a microcontroller, an image processor, a GPU, etc.) or combination of hardware processors; an input device 310 (such as a shutter button, a menu button, a microphone, a touchscreen, a etc.) for accepting input from a user and/or from the environment; memory 312; a signal generator 314 for generating one or more modulation signals for driving structured light source 302; and a communication system or systems 316 for allowing communication between processor 308 and other devices, such as an automated system (e.g., an automated industrial inspection system, an automated manufacturing system, an autonomous vehicle, etc.), a semi-automated system, a smartphone, a wearable computer, a tablet computer, a laptop computer, a personal computer, a game console, a server, etc., via a communication link. In some embodiments, memory 312 can store pixel values output by image sensor 304, depth values calculated based on output from image sensor 304, etc. Memory 312 can include a storage device (e.g., a hard disk, a solid state drive, a Blu-ray disc, a Digital Video Disk (DVD), RAM, ROM, EEPROM, etc.) for storing a computer program for controlling processor 308. In some embodiments, memory 312 can include instructions for causing processor 308 to execute processes associated with the mechanisms described herein, such as processes described below in connection with FIG. 7.

In some embodiments, light source 302 can be any suitable light source that can be configured to emit patterned light toward a scene 320 in accordance with a modulation signal (e.g., M(x)) received from signal generator 316. For example, light source 302 can include one or more light emitting diodes (LEDs), one or more laser diodes, one or more lamps, and/or any other suitable light source. In some embodiments, light source 302 can emit light at any suitable wavelength or combination of wavelengths. For example, light source 302 can emit visible light, near-infrared light, infrared light, etc. In some embodiments, light source 302 can be configured to emit light with a pattern that varies along one or more dimensions (e.g., varying as a column index changes, varying as a row index changes, varying as a function of both row and column index, etc.). For example, light source 302 can include (or be associated with) a spatial light modulator using one or more transmissive light crystal techniques modulation, one or more reflective liquid crystal on silicon modulation techniques, one or more digital light processing (DLP) modulation techniques (e.g., using micro mirrors that can be selectively oriented to emit light toward the scene or inhibit light from being emitted toward the scene). In some embodiments, light source 302 can include an array of light sources (e.g., LEDs, laser diodes, etc.) that can be controlled (e.g., individually addressed, addressed by column, etc.) to create a particular pattern of varying intensity across one or more dimensions of scene 320. In some embodiments, light source 302 can be implemented using a scanning laser beam that is controlled to vary intensity as it is scanned across the scene. In some embodiments, light source 302 can be implemented using a point light source (e.g., a laser diode, an LED, etc.) and one or more masks (e.g., a transparency, a diffractive optical element, etc.).

In some embodiments, image sensor 304 can be any suitable image sensor that can receive light reflected by scene 320 and, using one or more decoding techniques (e.g., as described below in connection with FIG. 7), generate signals that are indicative of the depth of particular points of scene 320 based on an identification of which portion of the pattern (e.g., a column index c) was projected onto the scene point. Any suitable technique or combination of techniques can be used to generate signals based on the images of each pattern projected onto the scene captured by image sensor 304.

In some embodiments, optics 306 can include optics for focusing light received from scene 320, one or more bandpass filters (e.g., narrow bandpass filters) centered around the wavelength of light emitted by light source 302, any other suitable optics, and/or any suitable combination thereof. In some embodiments, a single filter can be used for the entire area of image sensor 304 and/or multiple filters can be used that are each associated with a smaller area of image sensor 304 (e.g., with individual pixels or groups of pixels).

In some embodiments, signal generator 314 can be one or more signal generators that can generate signals to control light source 302 using a modulation signal. Although a single signal generator is shown in FIG. 3, any suitable number of signal generators can be used in some embodiments. Additionally, in some embodiments, signal generator 314 can be implemented using any suitable number of specialized analog circuits each configured to output a signal that can be used to control a spatially varying projection of light onto a scene (e.g., scene 320).

In some embodiments, system 300 can communicate with a remote device over a network using communication system(s) 316 and a communication link. Additionally or alternatively, system 300 can be included as part of another device, such as an automated system, a semi-automated system, a security system, a smartphone, a tablet computer, a laptop computer, etc. Parts of system 300 can be shared with a device within which system 300 is integrated. For example, if system 300 is integrated with an automated industrial inspection system, processor 308 can be a processor of the automated system and can be used to control operation of system 300.

In some embodiments, system 300 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as an automated system, a semi-automated system, a digital camera, a security camera, an outdoor monitoring system, a smartphone, a wearable computer, a tablet computer, a personal data assistant (PDA), a personal computer, a laptop computer, a multimedia terminal, a game console or peripheral for a gaming counsel or any of the above devices, a special purpose device, etc.

Communications by communication system 116 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 300 and another device, such as a network link, a dial-up link, a wireless link, a hard-wired link, any other suitable communication link, or any suitable combination of such links. System 300 and/or another device (e.g., a server, a personal computer, a smartphone, etc.) can enable a user to execute a computer program uses information derived using the mechanisms described herein to, for example, control a user interface.

It should also be noted that data received through the communication link or any other communication link(s) can be received from any suitable source. In some embodiments, processor 308 can send and receive data through the communication link or any other communication link(s) using, for example, a transmitter, receiver, transmitter/receiver, transceiver, or any other suitable communication device.

Figure 4A:
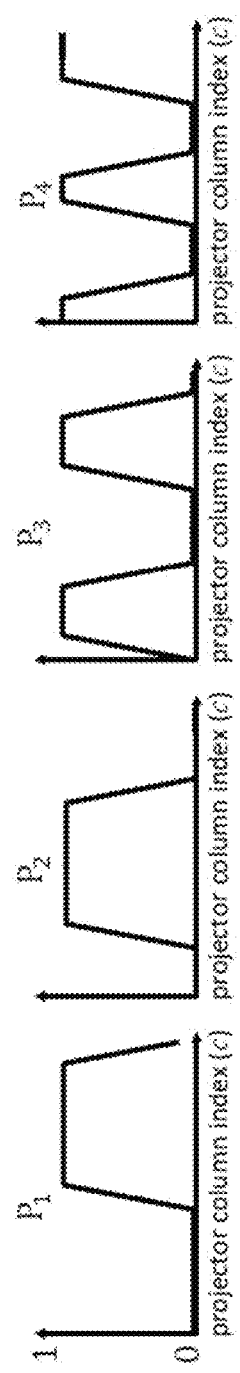
FIG. 4A shows an example of codes that can be used to implement a four pattern Hamiltonian coding scheme for structured light imaging in accordance with some embodiments of the disclosed subject matter.

FIG. 4A shows an example of codes that can be used to implement a four pattern Hamiltonian coding scheme for structured light imaging in accordance with some embodiments of the disclosed subject matter.

Figure 4B:
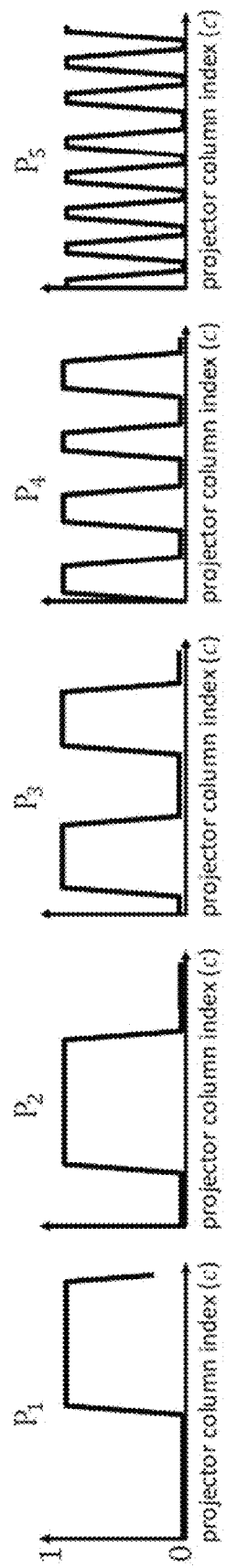
FIG. 4B shows an example of codes that can be used to implement a five pattern Hamiltonian coding scheme for structured light imaging in accordance with some embodiments of the disclosed subject matter.

FIG. 4B shows an example of codes that can be used to implement a five pattern Hamiltonian coding scheme for structured light imaging in accordance with some embodiments of the disclosed subject matter.

Since the Hamiltonian cycle visits every vertex of the cube exactly once, and the length of each side is 1, the length of the curve is $2^K-2$. Since the coding curve length increases exponentially as a function of K, the length of a Hamiltonian cycle on a hypercube graph can be more than an order of magnitude more than the coding curve of conventional sinusoid coding, whose length increases only as $\sqrt{K}$, as described below in connection with FIG. 5C. Additionally, given any two points on the curve, the ratio between their Euclidean distance and distance along the curve is bounded. Note that, in practice, the origin and the diagonally opposite vertex can be omitted from the Hamiltonian cycle in order to ensure that there are no projector columns with a code of all zeroes or all ones.

In general, when used for a SL coding scheme, Hamiltonian coding functions (i.e., coding functions for which the coding curve is a Hamiltonian cycle), are trapezoidal functions (e.g., as shown in FIG. 5D). For example, a Hamiltonian-based SL coding scheme for K=3 can be implemented using three trapezoidal functions that are shifted copies of each other (e.g., phase shifted by $$\frac{2\pi}{3}).$$

Three phase-shifted trapezoidal functions have been proposed in the past, and can be considered a special case of the family of Hamiltonian SL coding schemes. By contrast to the identical but phase-shifter curves for a K=3 Hamiltonian SL scheme, higher order Hamiltonian coding functions (i.e., K>3) are not necessarily shifted versions of each other, as shown in FIGS. 4A and 4B.

For example, as shown in FIG. 4A, the first two patterns ($P_1$, $P_2$) are phase shifted versions of each other, but the third pattern ($P_3$) and fourth pattern ($P_4$) are trapezoidal functions with higher frequencies and/or varying duty cycles.

A coding scheme based on Hamiltonian cycles generally induces a one-to-one mapping between unknown space and measurement space, and the inverse mapping (which can be referred to as decoding) can be performed analytically, allowing for a relatively fast inference of depth from the captured intensities while each pattern was projected.

FIGS. 4A and 4B are two examples of coding schemes that produce coding curves that form Hamiltonian cycles on K-dimensional unit cubes. More generally, for a Hamiltonian cycle on the K-dimensional unit cube as the coding curve, the $i^{th}$ coding functions $P_i$ for the Hamiltonian coding scheme can be defined as the value of the $i^{th}$ coordinate of points on the Hamiltonian cycle. As described above, the origin and the diagonally opposite vertex can be excluded from the Hamiltonian cycle so that for every projector column c, at least one (out of K) projected values is 0, and at least one projected values is 1. Constructing such Hamiltonian cycles on this reduced set of vertices is an NP-complete problem, with no known polynomial time algorithms. However, for relatively small K, it is possible to find cycles using search based algorithms.

FIGS. 5A to 5D show examples of a ramp-based pattern, a triangle-based pattern, a sinusoid-based pattern, and a Hamiltonian-based pattern that can be used to construct SL coding schemes, and the respective coding curves shown as a geometrical representation in three dimensional space. For example, FIG. 5A shows a coding curve of a ramp-based coding scheme for K=3 having projected patterns that are a constant 1, a constant 0, and an intensity ramp (e.g., the ramp shown in FIG. 5A). In such an example, the coding curve for the ramp-based coding scheme is a line segment of length 1. As another example, FIG. 5B shows a coding curve of a triangle-based coding scheme having projected patterns that are the triangle shown in FIG. 5B offset in various positions with respect to the column index. In such an example, the coding curve for a K=3 triangle-based coding scheme is a non-planar polygon with a curve length of about 3.46 times the length of a ramp coding scheme (i.e., $2\sqrt{K}$ for K=3). As yet another example, FIG. 5C shows a coding curve of a sinusoid-based SL coding scheme, which is a circle of radius $$\frac{\sqrt{K}}{2\sqrt{2}},$$

where K≥3 is the number of phase-shifts (number of measurements). In a more particular example, for K=3, the coding curve length of sinusoid coding is roughly 3.84 times that of ramp coding (i.e., $$\frac{\pi}{\sqrt{2}}\sqrt{K}$$

for K=3). As yet another example, FIG. 5D shows a coding curve of a Hamiltonian-based SL coding scheme, which is a cycle on a unit hypercube of dimension K, which corresponds to a curve length of $2^K-2$, if K is odd, and $2^K-4$, if K is even. In the particular example shown in FIG. 5D for K=3, the coding curve length is about 6 times the length of that of ramp coding (i.e., $2^K-2$ for K=3). Accordingly, given the same scene and imaging system, sinusoid-based coding (for K=3) can achieve approximately 3.84 times precision (i.e., lower error) as compared to ramp coding, and Hamiltonian-based coding (for K=3) can achieve approximately 1.5 times precision of sinusoid-based coding.

Figure 6B:
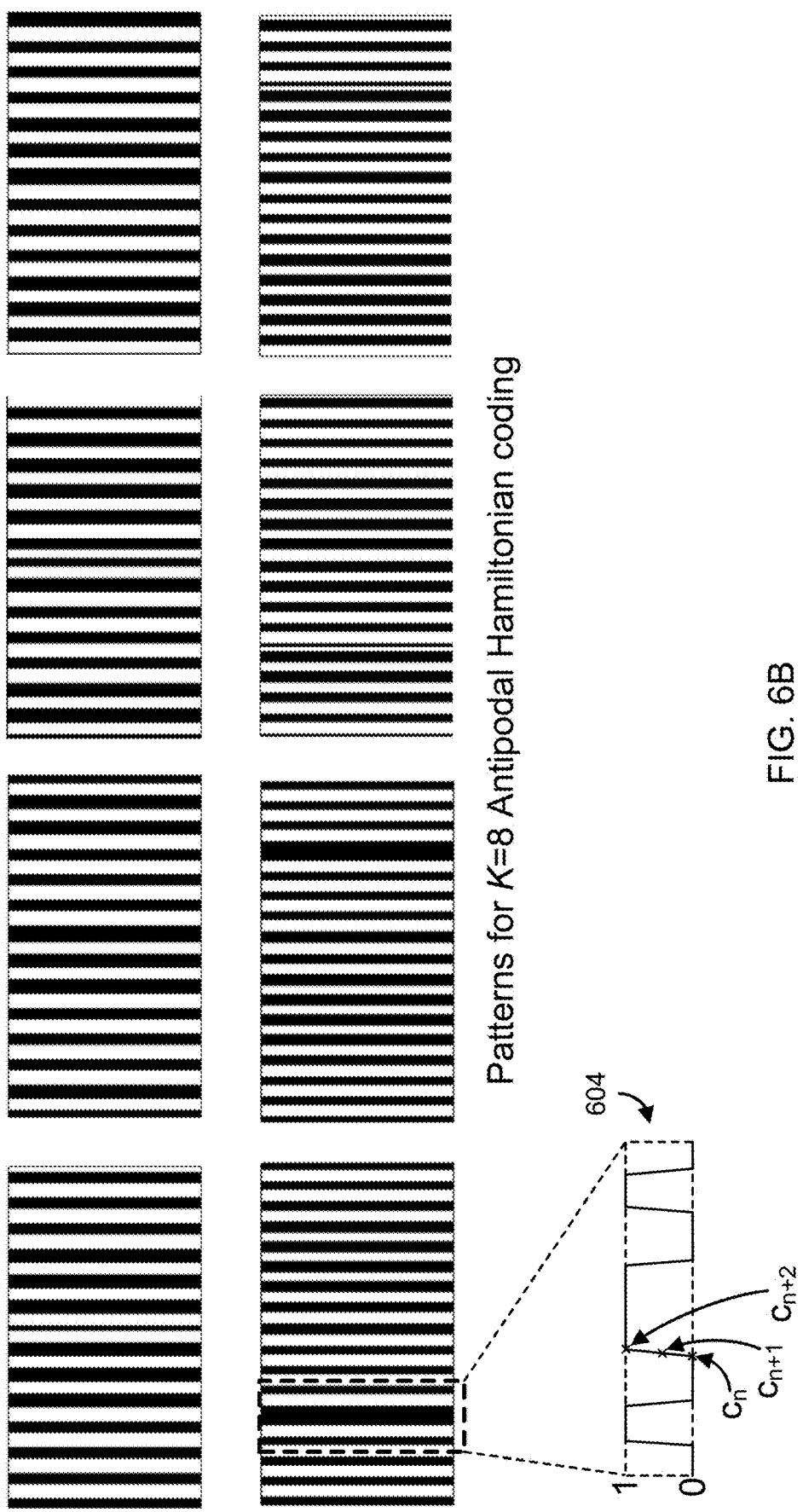
FIG. 6B shows another example of projector intensity patterns as a function of column index for an eight pattern Hamiltonian coding scheme for structured light imaging in accordance with some embodiments of the disclosed subject matter.

FIG. 6A shows an example of projector intensity patterns as a function of column index for an eight pattern Hamiltonian coding scheme for structured light imaging in accordance with some embodiments of the disclosed subject matter. Note that although the patterns in FIGS. 6A to 6C appear to be binary (i.e., transmittance of 0, completely opaque corresponding to a black color, or transmittance of 1, completely transparent corresponding to a white color) this is merely due to the relatively rapid transitions between transmittance of 0 and 1, and vice versa. As shown in boxes 602 and 604, the transition between 0 and 1 transmittance (or vice versa) can include one or more columns of transmittance between 0 and 1, the particular values of which can be based on the value of the coding function at that column index.

FIG. 6B shows another example of projector intensity patterns as a function of column index for an eight pattern Hamiltonian coding scheme for structured light imaging in accordance with some embodiments of the disclosed subject matter.

Figure 6C:
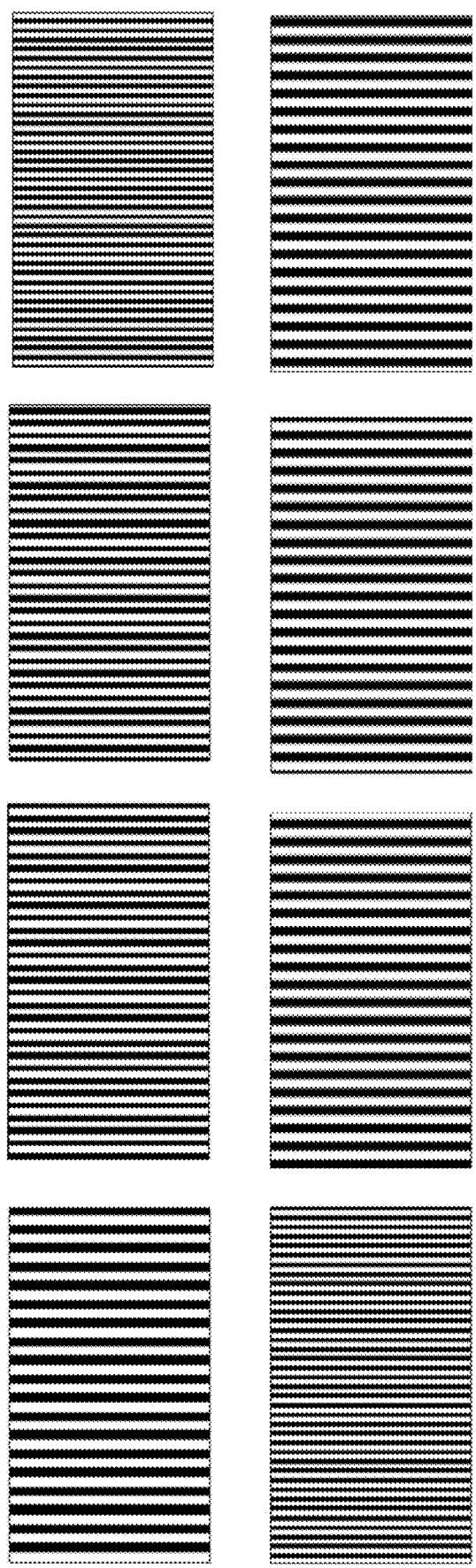
FIG. 6C shows yet another an example of projector intensity patterns as a function of column index for an eight pattern Hamiltonian coding scheme for structured light imaging in accordance with some embodiments of the disclosed subject matter.

FIG. 6C shows yet another an example of projector intensity patterns as a function of column index for an eight pattern Hamiltonian coding scheme for structured light imaging in accordance with some embodiments of the disclosed subject matter.

The image formation model described above in connection with EQ. (1) assumes that scene points are illuminated only directly by the projector, so that each camera pixel receives light only from a single projector column. However, in practice, scene points may receive light from other scene points as well (e.g., due to interreflections and scattering). Additionally, for scenes with large depths, the projected patterns may get defocused (e.g., due to limited depth-of-focus of the projector optics). This can result in camera pixels receiving light from multiple projector columns. Such effects, which can be collectively referred to as indirect or global illumination, can lead to significant errors in the recovered shape. Note that the coding schemes in FIGS. 4A and 4B including patterns with relatively low spatial frequency (e.g., at least patterns $P_1$ and $P_2$). Such low spatial frequency patterns can contribute to larger errors due to indirect illumination. In some embodiments, coding schemes with relatively high spatial frequency patterns can mitigate such errors in comparison to schemes including lower frequency patterns.

Note that for K>3, the Hamiltonian cycle on a hypercube graph is not unique (i.e., modulo isomorphic cycles exist). A Hamiltonian cycle can be characterized by the order in which the hypercube vertices are visited, and for K>3, there exist multiple (exponential in K) orderings of the vertices of the hypercubes, corresponding to different Hamiltonian cycles. In some embodiments, the set of patterns cording functions for a particular Hamiltonian-based SL coding scheme can be based on a particular Hamiltonian cycle for a hypercube of dimension K. For example, FIGS. 6A and 6B show two different sets of Hamiltonian patterns for K=8.

Additionally, different coding functions have different properties in terms of the set of constituent spatial frequencies. For example, as shown FIG. 6A, the different patterns have a broad range of spatial frequencies (e.g., progressing higher in spatial frequency), whereas, as shown in FIG. 6B, all of the patterns have relatively high, and similar frequencies.

Gray codes are a sequence of binary codes configured such that consecutive codes differ in only 1 bit (i.e., the Hamming distance between consecutive codes is 1). In some embodiments, a sequence of K-bit Gray codes can be constructed by first assigning a K-bit binary code to every vertex of a unit K-dimensional hypercube. In such embodiments, the code can be based on the coordinates of the vertex. For example, the origin can be assigned a binary code [0, . . . , 0]. In such an example, a Gray code sequence can determined by traversing all the vertices of the hypercube along a Hamiltonian cycle. Accordingly, in some embodiments, a Hamiltonian cycle on a hypercube graph can correspond to both a Gray codes sequence, as well as a set of Hamiltonian functions. In such embodiments, the Hamiltonian functions can be analogous to a continuous version of a binary Gray codes. Note that different Hamiltonian cycles can induce Gray codes and Hamiltonian functions with different characteristics. For example, the Hamiltonian patterns shown in FIG. 6A are based on reflected Gray codes, which are defined recursively. In a more particular example, a K-bit reflected Gray code can be created by first appending 0 to each element of the (K−1)-bit Gray code, then listing the (K−1)-bit Gray code in reverse, appending 1 to each element. The starting point for such a reflected Gray code can be a 1-bit Gray code [0; 1]. A resulting Hamiltonian-based SL coding scheme can include a broad range of frequencies (i.e., including low frequencies), which can render the coding scheme less suitable for applications in which the SL imaging system is likely to encounter relatively high levels of global illumination.

In some embodiments, for applications in which the SL imaging system is likely to encounter relatively high levels of global illumination, Hamiltonian functions based on Gray codes with only high spatial frequencies can be used. For example, results in combinatorial mathematics can be used to construct Gray code sequences with desirable properties, such as codes with small stripe widths (and hence, high frequencies). In such an example, these Gray code sequences can be used to generate Hamiltonian functions that can be used in a Hamiltonian SL coding scheme that is relatively robust to global illumination. In a more particular example, FIG. 6B shows Hamiltonian patterns using a sequence of antipodal Gray codes, which have the property that the binary complement of a string appears a fixed distance from it in the ordering. As shown in FIG. 6B, antipodal Gray codes, and the corresponding Hamiltonian functions have a narrow set of relatively high frequencies, thus resulting in a coding scheme that is more robust to global illumination effects.

In some embodiments, for applications in which the SL imaging system is likely to encounter relatively high levels of global illumination, Hamiltonian functions based on micro phase shifting can be used, which can involve the use of patterns with frequencies within a narrow, high-frequency band. In such embodiments, phase unwrapping can be performed by combining phase information from several high-frequencies, and multiple sets of Hamiltonian functions, with small, co-prime periods (i.e., high frequencies) can be used to implement a Hamiltonian-based SL coding scheme that is relatively robust to global illumination effects. For example, FIG. 6C shows an example micro Hamiltonian coding scheme with K=8 patterns that correspond to a combination of two sets of Hamiltonian patterns. More particularly, Hamiltonian patterns for K=3 and K=5 coding schemes (e.g., as shown in FIGS. 5D and 4B, respectively) can be used to form a K=8 coding scheme, and the patterns can be compressed to have periods of 203 pixels (e.g., where 1 pixel corresponds to 1 column) and 97 pixels, respectively (e.g., rather than the 1920 pixel period shown in FIGS. 5D and 4B). That is, rather than using a single period of the patterns for K=3 and K=5, the patterns can be repeated multiple times across the projector. In the example shown in FIG. 6C, the total number of projector columns is $N_c$=1920. While each set recovers the correspondence modulo its respective period, the ambiguous correspondences can be combined via phase-unwrapping techniques to recover unambiguous depths.

In some embodiments, micro Hamiltonian coding schemes can be configured in various different ways, which facilitates fine control of the properties (e.g., spatial frequencies) of the projected patterns, and FIG. 6C shows patterns for a single example of a micro Hamiltonian coding scheme. For example, several base Hamiltonian pattern sets, with different periods, can be combined into a single micro Hamiltonian coding scheme. For instance, a micro Hamiltonian scheme with K=8 patterns can be designed by combining K=3 and K=5 base Hamiltonian sets, or two K=4 base Hamiltonian sets with different periods, or one full K=3 set, and 5 single patterns from the K=3 set. Given system parameters (e.g., the number of projector columns, number of projected patterns), and scene characteristics (e.g., amount and/or nature of global illumination), a search-based procedure can be used to compute the best combination of base patterns and periods (e.g., from a set of available combinations) of a micro Hamiltonian coding scheme. Note that the patterns shown in FIG. 6C are an example of a micro Hamiltonian coding scheme that can be generated using these techniques.

Note that both micro Hamiltonian coding and Gray code based Hamiltonian coding (e.g., antipodal Hamiltonian patterns) can provide robustness to global illumination. In general, Gray code based Hamiltonian schemes have a more restricted design space, and allow more limited control over the spatial frequencies of the projected patterns, while micro Hamiltonian coding provides greater control over the spatial frequencies. However, micro Hamiltonian codes can require phase unwrapping for decoding, and thus, may suffer from errors in low SNR scenarios due to incorrect unwrapping, while antipodal Hamiltonian codes can achieve high precision even in low SNR (e.g., as shown in, and described below in connection with, FIGS. 11D and 12C). Note that although optimization approaches are described herein for Gray code based Hamiltonian codes and micro Hamiltonian codes, these are merely examples, and other optimization approaches can be used to generate Hamiltonian SL coding schemes that can achieve high SNR, and have desired spatial frequencies (e.g., very high frequencies that facilitate robust performance in the presence of specular interreflections).

Figure 7:
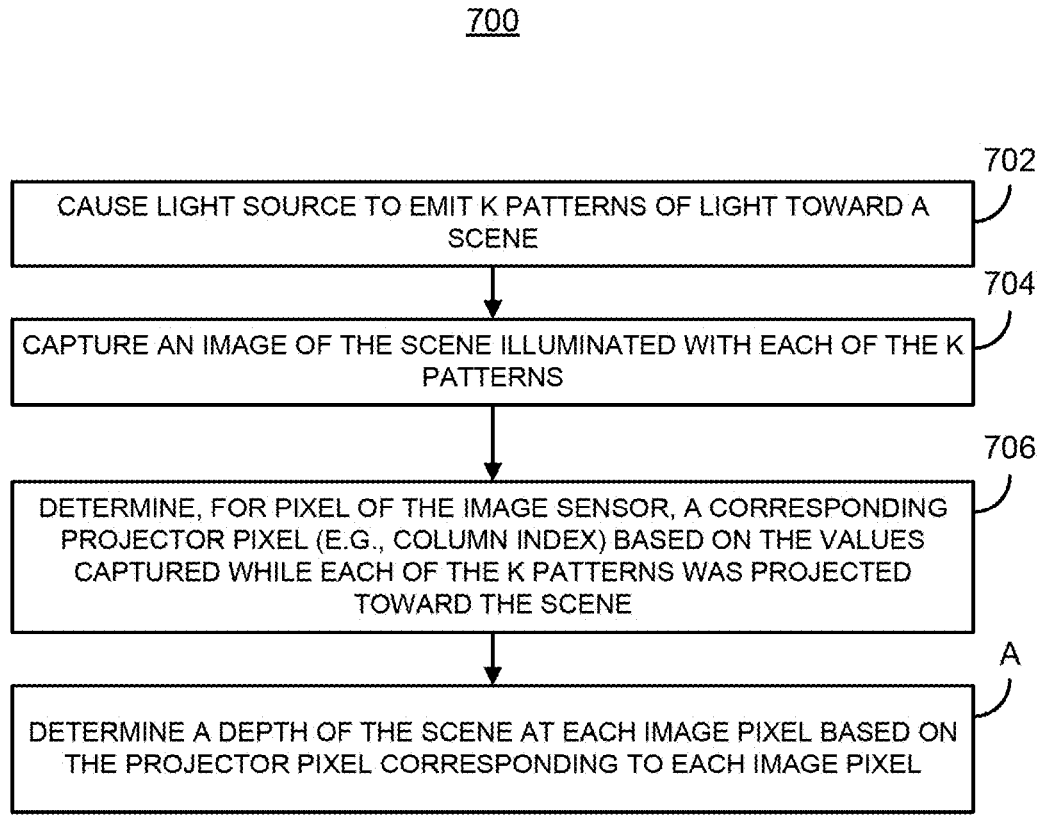
FIG. 7 shows an example 700 of a process for measuring depth in a scene in accordance with some embodiments of the disclosed subject matter.

FIG. 7 shows an example 700 of a process for measuring depth in a scene in accordance with some embodiments of the disclosed subject matter. At 702, process 700 can cause a light source (e.g., light source 302) to emit a series of K patterns of light toward a scene. For example, the K patterns can be patterns from a Hamiltonian-based SL coding scheme that includes K patterns. In a more particular example, process 700 can cause the light source to emit the series of four patterns shown in FIG. 4A. In another more particular example, process 700 can cause the light source to emit the series of five patterns shown in FIG. 4B. In yet another more particular example, process 700 can cause the light source to emit a series of eight patterns, including the four patterns shown in FIG. 6A, 6B, or 6C.

At 704, process 700 can cause at least one image of the scene illuminated by each of the K patterns to be captured (e.g., by image sensor 304). For example, in connection with projecting each pattern at 702 (e.g., while projecting each pattern, within a particular period of time of each pattern being projected), process 700 can capture an image of the scene illuminated by a particular pattern. In a more particular example, process 700 can use the projection of a pattern to trigger capture of an image. In another more particular example, process 700 can initiate projection of the pattern by the light source at 702, and capture of an image of the scene illuminated by the light source at 704 substantially simultaneously.

At 706, process 700 can determine, for each pixel of the image sensor, a corresponding projector pixel (e.g., a column index, a row index, etc.) based on the intensity values in the images captured at 704 while each pattern was being projected toward the scene. In some embodiments, process 700 can use any suitable technique or combination of techniques to determine which projector pixel (e.g., column index c) corresponds to the imaging pixel. For example, in some embodiments, coding functions $P_i$ ($1 \leq i \leq K$) of a Hamiltonian SL coding can be sub-divided into $2^K-2$ sub-intervals (for odd values of K) or $2^K-4$ sub-intervals (for even values of K). In each sub-interval, one (out of the K) functions increases (or decreases) linearly from 0 to 1 (or 1 to 0), while the other K−1 functions are constant 0 or 1. In some embodiments, the sub-intervals can correspond to an index λ, $1 \leq \lambda \leq 2^K-2$ (or $2^K-4$ for even K). In such embodiments, given a set of measured intensities I=[$I_1, I_2, \ldots, I_K$] for a particular image sensor pixel, the column index c (or other index) can be determined by first estimating the sub-interval λ in which the column index is present, and based on the sub-interval, determining the projector column corresponding to the pixel.

In some embodiments, process 700 can estimate the index λ of the sub-interval that c lies within, where c is the correct projector correspondence. In such embodiments, each index λ can be associated with a particular combination of the K−1 patterns that are constant values in the interval, and the value of each of those patterns in the interval. For example, process 700 can determine a first image(s) for which the pixel value is a minimum, and another image(s) for which the pixel value is a maximum. In such an example, an image for which the pixel value falls between the minimum and maximum value can be identified as the pattern that is not constant in the interval.

In some embodiments, at 706, process 700 can attempt to determine the correct projector correspondence c by determining the sub-interval index λ of the sub-interval that c lies in. In such embodiments, process 700 can decode which sub-interval c lies in based on a unique combination of the identities (i.e., indices i as described above) and values of the K−1 coding functions that are constant within the sub-interval, as each sub-interval has a unique combination of such identities and values. Process 700 can compute λ by identifying the indices and values of the measured intensities that correspond to the K−1 constant functions.

In some embodiments, process 700 can identify the intensities that are constant by performing a clustering of the K measured intensities (at every pixel of the image sensor) into various clusters. For example, process 700 can place one or more of the intensities into a cluster corresponding to the coding functions being 0 (low intensities). Note that the intensities placed in this cluster are sometimes referred to herein as $I_{low}$. As another example, process 700 can place one or more of the intensities into a cluster corresponding to the coding functions being 1 (high intensities). Note that the intensities placed in this cluster are sometimes referred to herein as $I_{high}$. As yet another example, process 700 can place one or more of the intensities into a cluster corresponding to the linearly increasing (or decreasing) function. Note that this cluster and/or value is sometimes referred to as the median intensity value for convenience, although it may not be the median value in the set of K intensity values (e.g., where K−2 values are 0, the true median value would be 0, but the median intensity value for the purpose of clustering can be whichever of the remaining two values does not belong in the high intensity cluster). That is, it is the value most likely to not belong in either of the other two clusters. Note that, as described above, the origin and opposite vertex can be omitted from the Hamiltonian cycle, which can insure that no code exists in which all values are 0 or 1 in the coding function. In embodiments, process 700 can be constrained such that the cluster with the median intensity value includes one, and only one, member. In some embodiments, the cluster in which a value is placed can be used to determine the identities of the K−1 indices that are constant in the sub-interval), and can use this information to decode which sub-interval c is in.

In some embodiments, process 700 can use the sub-index interval λ and the intensity value of the index i corresponding to the median intensity value to determine the location of the correspondence c within the sub-interval. In some embodiments, process 700 can retrieve (or otherwise receive) information about projected intensities P(c)=[P$_1$(c), P$_2$(c), . . . , P$_K$(c)] for each column index c within the identified sub-interval λ. A sub-interval of the coding functions can correspond to a particular edge of the Hamiltonian cycle (e.g., a particular edge of the coding curve between two vertices of the hypercube). For example, if the projected intensities P(c) for the sub-interval lie on an edge between two cube vertices (e.g., P$_{left}$ and P$_{right}$), the coding curve point P$_c$ for the particular column index correspondence to c can be represented as a linear combination of P$_{left}$ and P$_{right}$ as: P(c)=κP$_{left}$+(1−κ)P$_{right}$, where 0≤κ≤1 is the location of the correspondence c within the sub-interval.

In some embodiments, process 700 can determine the average (e.g., arithmetic mean) of intensities in the cluster corresponding to a 0 in the coding function I$_{min}$=mean(I$_{low}$), where I$_{low}$ is the set of intensities in the low-intensity cluster. Additionally, in some embodiments, process 700 can determine the average (e.g., arithmetic mean) of intensities in the cluster corresponding a 1 in the coding function I$_{max}$=mean (I$_{high}$), where I$_{high}$ is the set of intensities in the high-intensity cluster. In some embodiments, process 700 can determine the location K within the sub-interval by finding the relative intensity of the intensity in the mean intensity cluster based on the following relationship:

$$\kappa = \frac{I_{med} - I_{min}}{I_{max} - I_{min}},$$

where I$_{med}$ is the intensity of the value placed in the third (median intensity) cluster (which, as discussed above, may not be the median value of the K intensity values).

In some embodiments, having determined the sub-interval index λ and the location K within the sub-interval, process 700 can determine the column index correspondence c using any suitable technique or combination of techniques. For example, process 700 can access a look-up table that includes correspondences between column index c and relative intensity values (e.g., excluding effects of global illumination by taking into account the average high intensity and average low intensity values) for the identified sub-interval λ to determine a particular column index c to which the calculated relative intensity value κ corresponds. In some embodiments, the correspondence between relative intensity values and column index within each sub-interval can be determined empirically (e.g., through a calibration procedure) and/or analytically (e.g., by determining the expected value for each column index based on the slope of the increasing or decreasing coding function within each sub-interval). In some embodiments, the column index correspondence c can be determined based on the number of columns represented in the patterns, and the number of sub-intervals into which the pattern is divided. For example, the following relationship can be used to determine the column index correspondence c:

$$c = \frac{N_c \times (\lambda - 1 + \kappa)}{N_s}, \quad (5)$$

where N$_c$ is the total number of projector columns in the patterns, and N$_s$ is the total number of sub-intervals (e.g., 2$^K$−2 sub-intervals for odd values of K, or 2$^K$−4 sub-intervals for even values of K). Additionally or alternatively, in some embodiments, one or more lookup tables can be stored in memory (e.g., memory 312) that relate columns with code values (e.g., every column is associated with a unique code comprising a sequence of intensities), sub-interval λ, and/or relative intensity value κ, and the column index correspondence c can be determined from the lookup table. For example, this can be especially useful when sub-interval λ, and/or relative intensity value κ cannot be reliably determined due to one or more sources of imaging error (e.g., defocus, noise, interefflections, etc.).

Note that, while Hamiltonian patterns described herein can effectively account for some degree of global illumination, higher frequency global illumination and/or ambient illumination may affect results more than lower frequency illumination. For example, global illumination caused by interreflections of the light projected by the light source (e.g., light source 302) can affect the projected patterns, and cause the observed image to diverge from patterns that would be captured without interreflections. Such global illumination within the scene can vary based on how much of the scene is relatively highly reflective and/or the due to the amount of light reflected by one or more portions of the scene. In a more particular example, the mechanisms described herein can reduce the effect of relatively low frequency global illumination (e.g., due to interreflections from a diffusely reflective surface and/or from a small portion of the scene) on depth estimates due to the design of the patterns. As described above in connection with FIGS. 6A to 6C, higher frequency patterns can reduce the effect of such global illumination. However, as the frequency of global illumination grows (e.g., due to the presence of one or more mirrors and/or other sources of highly specular interreflections, or the presence of reflective surfaces across a larger portion of the scene), less benefit is provided from the same frequency patterns. In such examples, higher frequency Hamiltonian patterns can be used for measuring scenes with higher frequency global illumination. As another example, if the ambient light intensity (i.e., light from a source other than the projector) rapidly varies in time (e.g., the intensity of the ambient light at a particular imager pixel varies significantly between successive images in a sequence corresponding to the K projected patterns) the measured intensities can diverge from the patterns, which can produce erroneous depth measurements. In such an example, if the ambient light decreases between a first image corresponding to a first pattern and a second image corresponding to a second pattern, even if a particular column is the same value in both patterns (e.g., a maximum intensity) the measured intensity may vary by more than the difference between the maximum intensity and minimum intensity were the ambient light constant. In some embodiments, the mechanisms described herein can be used in a complementary manner with other techniques for suppressing the effects of ambient illumination (e.g., optical technique for suppressing contributions from ambient illumination).

At 708, process 700 can determine a depth of the scene at each imaging pixel based on the projector pixel corresponding to each imaging pixel. In some embodiments, process 700 can use any suitable technique or combination of techniques to determine the scene depth for each pixel. For example, in some embodiments, based on the separation of the imager pixel location and the projector column location (e.g., lateral distance between the two locations), process 700 can determine the depth of the scene point imaged by the pixel. In general, the light measured by a particular imager pixel can be modeled as a ray reflected from a point in the scene toward the imager pixel, and the projector emits a light plane from each column of the light source with the pattern of intensity varying as the patterns change. In some embodiments, after determining the corresponding column index c, the depth in the scene can be determined based on the point at which the light ray hitting the imager pixel and the light plane projected by the light source intersect in the scene (e.g., as shown in FIG. 1A).

In some embodiments, process 700 can select a set of patterns to emit at 702 based on the composition of the scene and/or ambient lighting conditions. For example, process 700 can estimate the amount of interreflection likely to be caused by one or more objects in the scene, and can select a set of patterns with higher frequency Hamiltonian patterns (e.g., the patterns shown in FIGS. 6B and 6C). In such an example, as the frequency of interreflections increases, process 700 can select higher frequency of Hamiltonian patterns. As another example, process 700 can determine if the intensity of ambient light is varying in the scene (e.g., due to a light source with varying intensity, due to an object periodically blocking a light source, etc.), and if the ambient light intensity varies at a consistent frequency, process 700 can modify the timing at which images are captured to attempt to ameliorate any effect that the temporally varying ambient light has on depth estimates. In some embodiments, system 700 can capture an image (e.g., with or without a particular pattern projected) to provide as input to a machine learning system (e.g., a neural network) trained to identify high-frequency reflectors (e.g., mirrors, specular surfaces, etc.) in the image to determine the amount of interreflections likely present in a scene. In such embodiments, process 700 can select a set of projection patterns to use based on an estimated amount of interreflections that are expected based on the presence of one or more high-frequency reflectors identified by the machine learning system. Additionally or alternatively, in some embodiments, process 700 can capture an image (e.g., with or without a particular pattern projected) to provide as input to a machine learning system trained to classify the image based on the expected frequency of interreflections (e.g., based on the presence of one or more high frequency reflectors), and based on the classification, process 700 can select a set of projection patterns to use based on a correspondence between the classes of the machine learning system and sets of projection patterns.

Figure 8:
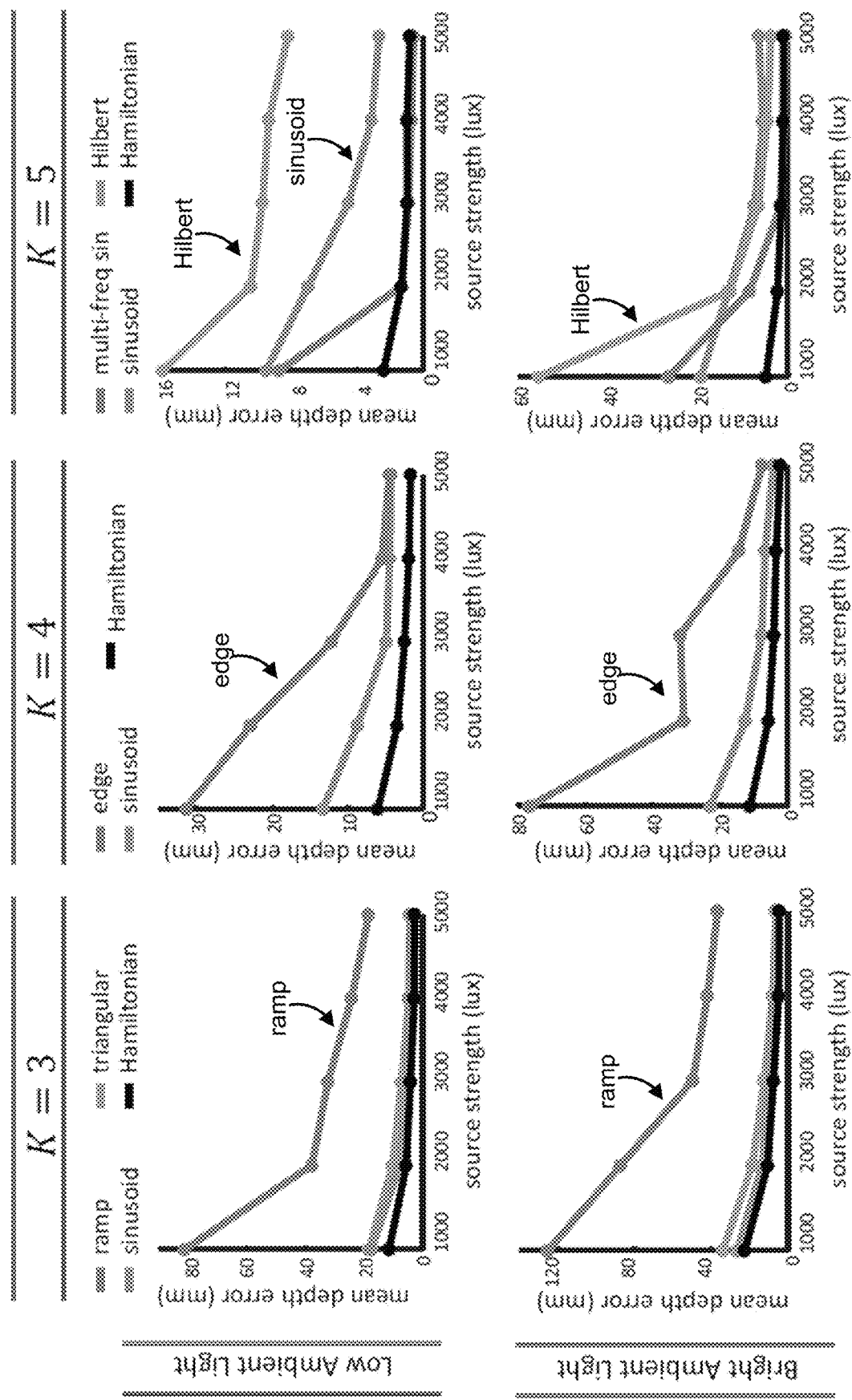
FIG. 8 shows examples of mean depth errors under low and high ambient lighting conditions for various coding schemes, including Hamiltonian coding, using different numbers of patterns.

FIG. 8 shows examples of mean depth errors under low and high ambient lighting conditions for various coding schemes, including Hamiltonian coding, using different numbers of patterns. The values shown in FIG. 8 were found using a structured light system that included a Canon T5i DSLR camera, and an Epson 3LCD projector. The scene being imaged was a diffuse, white planar surface, with known ground truth depths, approximately in the range [1100, 1600] millimeters. A broad range of SNR scenarios were emulated by using different brightness values of the source projector (i.e., the projector that projected the structured light patterns onto the scene), and another projector that acted as an ambient illumination source. As shown in FIG. 8, the depth errors for several coding schemes, at different source and ambient light strengths, and different number of patterns (K) were determined using this system. Note that the Y axes in FIG. 8 vary based on the maximum mean depth error mean of the coding schemes being evaluated. The total capture time was the same for all the coding methods. For K=3, ramp coding results in large errors, due to a small coding curve length (e.g., as described above in connection with FIG. 5A). For K=4 and 5, Hamiltonian coding significantly outperforms existing approaches such as sinusoid coding. This can be attributed to the coding curve length for Hamiltonian coding, which increases exponentially with K, while sinusoid coding increases only as $\sqrt{K}$ (e.g., as described above in connection with FIGS. 5C and 5D). The coding curves for edgeterns and Hilbert patterns are not distance preserving, which results in larger depth errors at low SNR (low source brightness, high ambient brightness) settings. For K=5, Hamiltonian coding is compared with a multi-frequency sinusoid scheme, which uses sinusoid patterns of multiple frequencies, for example, one high frequency and one low (unit) frequency. Three patterns were used for the unit frequency (separated by $$\frac{2\pi}{3}$$

shifts), and two patterns at the highest spatial frequency in Hamiltonian coding patterns (separates by $$\frac{\pi}{2}$$

shifts). The high frequency phase provides accurate but ambiguous projector correspondence. The low frequency phase is then used to resolve the ambiguities (phase unwrapping). At high SNR, multi-frequency sinusoid scheme achieves similar performance as Hamiltonian coding. However, at low SNR, the multi-frequency sinusoid suffers from inaccurate unwrapping, and thus, larger depth errors. In contrast, the performance of Hamiltonian coding degrades more gradually as the SNR decreases.

FIGS. 9A to 9C show examples of two scenes measured using structured light imaging techniques with a four pattern sinusoid-based coding scheme and a four pattern Hamiltonian-based coding scheme, and the depth values calculated for the scenes mapped as three dimensional surfaces based on each of the coding schemes. As shown by comparison between FIGS. 9B and 9C, while the sinusoid coding is able to resolve the general shape of the objects in the scene, the Hamiltonian coding is able to resolve finer details and produces less noisy depth values (e.g., as indicated by the smoother surfaces shown in FIG. 9C). Note that the patterns shown in FIG. 4A were used to generate the depth values represented in FIG. 9C.

FIGS. 10A to 10D show examples of three scenes measured using structured light imaging techniques with a five pattern sinusoid-based coding scheme, a five pattern multi-frequency sinusoid-based coding scheme, and a five pattern Hamiltonian-based coding scheme, and the depth values calculated for the scenes mapped as three dimensional surfaces based on each of the coding schemes. Note that the patterns shown in FIG. 4B were used to generate the depth values represented in FIG. 10D.

Figure 10A:
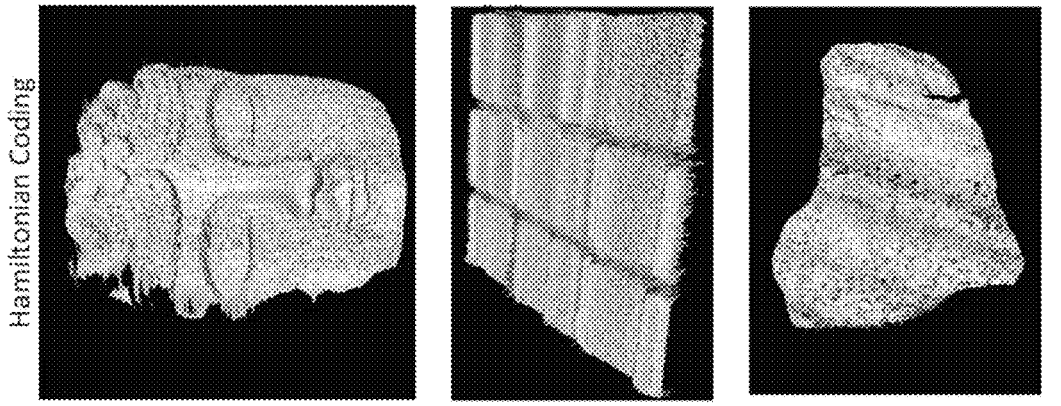
FIG. 10A shows examples of three scenes measured using structured light imaging techniques with a five pattern sinusoid-based coding scheme, a five pattern multi-frequency sinusoid-based coding scheme, and a five pattern Hamiltonian-based coding scheme.
Figure 10B:
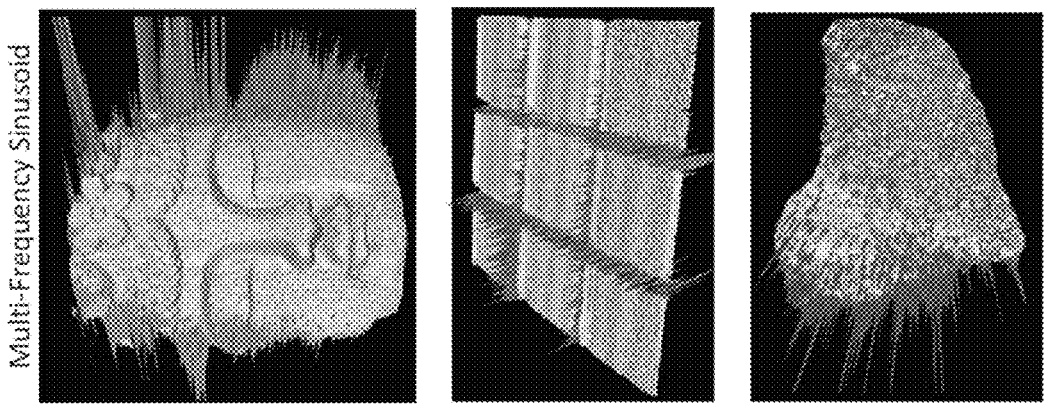
FIG. 10B shows examples of depth values calculated for the scenes in FIG. 10A using the five pattern sinusoid-based coding scheme mapped as three dimensional surfaces.
Figure 10C:
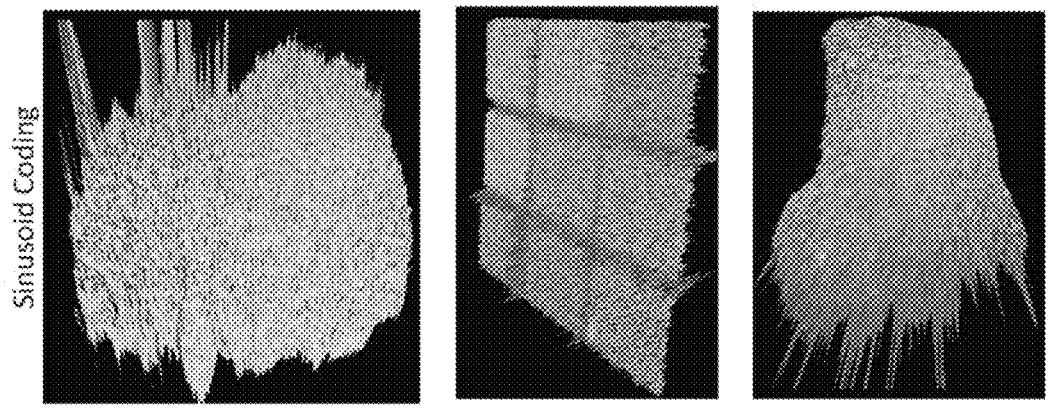
FIG. 10C shows examples of depth values calculated for the scenes in FIG. 10A using the five pattern multi-frequency sinusoid-based coding scheme mapped as three dimensional surfaces.
Figure 10D:
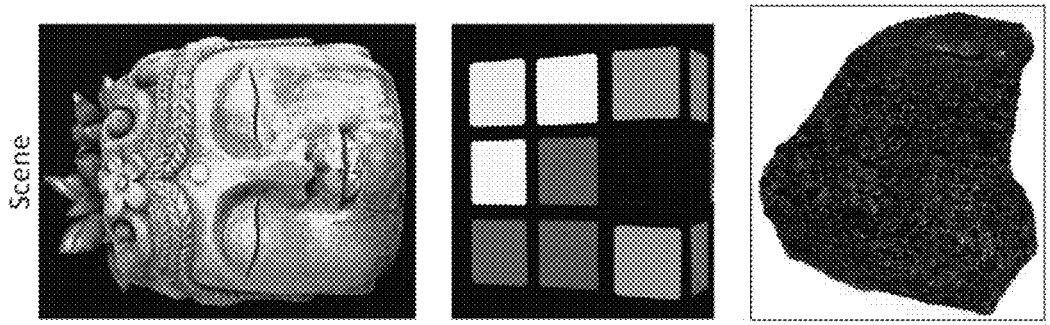
FIG. 10D shows examples of depth values calculated for the scenes in FIG. 10A using the five pattern Hamiltonian-based coding scheme mapped as three dimensional surfaces.

FIGS. 9A to 9C, and 10A to 10D generally illustrate the differences in results generated by Hamiltonian, single-frequency sinusoid and multi-frequency sinusoid SL coding schemes. As shown, single-frequency sinusoid (e.g., in FIGS. 9B and 10B), in general, achieves a relatively low depth resolution, resulting in loss of surface detail. With the same source power and capture time, Hamiltonian coding recovers finer details such as the seam on the ball and the ridge on the figure (FIG. 9C), and the facial features of the statue (FIG. 10D). Multi-frequency sinusoid coding can recover finer geometric details than single-frequency sinusoid, especially in high SNR conditions. However, the performance of multi-frequency sinusoid degrades considerably in lower SNR conditions, which is apparent from the larger depth errors for the black ridges on the Rubik's cube, and the lava rock (FIG. 10C). In contrast, Hamiltonian coding can recover fine details such as the pores on the rock, despite the scene having extremely low albedo.

FIGS. 11A to 11D show examples of a scene with interreflections measured using structured light imaging techniques with a micro phase shifting-based coding scheme, a micro Hamiltonian-based coding scheme, and an antipodal Hamiltonian-based coding scheme, and the depth values calculated for the scenes mapped as three dimensional surfaces based on each of the coding schemes.

FIGS. 12A to 12C show examples of scenes including defocused portions measured using structured light imaging techniques with a micro phase shifting-based coding scheme, and an antipodal Hamiltonian-based coding scheme, and the depth values calculated for the scenes mapped as three dimensional surfaces based on each of the coding schemes.

FIGS. 11A to 11D, and 12A to 12C generally illustrate depth recovery results for scenes with global illumination and/or defocus. The bowl in FIG. 11A is made of white, glossy material, resulting in strong interreflections. The candle in FIG. 12A has subsurface scattering, and the depth-range for the forks in FIG. 12A is large, resulting in projector defocus. Each of the schemes depicted used eight patterns (i.e., K=8), including the micro phase shifting (MPS) scheme using sinusoids. While MPS generally performs reliably in moderate to high SNR scenarios, its performance degrades at low SNR due to unwrapping errors, resulting in large depth incorrect unwrapping. However, the Hamiltonian schemes outperform MPS in the depicted scenes by using high frequency Hamiltonian patterns, instead of sinusoids. As shown in FIGS. 11C, 11D, and 12C, antipodal Hamiltonian techniques perform well for the scenes shown in FIGS. 11A and 12A, even at low SNR, while mitigating errors due to global illumination effects that are present in the MPS results.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 7 can be executed or performed in any order or sequence not limited to the order and sequence shown and described in the figures. Also, some of the above steps of the processes of FIG. 7 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for estimating depths in a scene, the system comprising:
a light source;
an image sensor comprising a pixel;
at least one hardware processor that is programmed to:
cause the light source to emit K light patterns toward the scene, wherein each of the K light patterns includes at least one trapezoid-shaped wave and is different from each of the other K light patterns, and wherein at least one of the K light patterns includes at least two trapezoid-shaped waves, wherein K>4;
cause the image sensor to generate an intensity value during emission of each of the K light patterns such that the pixel is associated with at least K intensity values;
determine a depth estimate for a portion of the scene imaged by the pixel based on the K intensity values associated with the pixel.

2. The system of claim 1, wherein each of the K light patterns is based on a coding function, and wherein the K light patterns are based on a Hamiltonian cycle of a K-dimensional hypercube.

3. The system of claim 2, wherein the at least one hardware processor is further programmed to cause the light source to emit a first light pattern of the K light patterns by causing a first plurality of columns of the light source to emit light at a maximum intensity, and causing at least one column adjacent to the first plurality of columns to emit light at a fraction of the maximum intensity.

4. The system of claim 1, wherein the light source comprises a plurality of columns, each of the plurality of columns associated with a column index c, and wherein the plurality of columns is sub-divided into at least $2^K-4$ sub-intervals $\lambda$ such that in each sub-interval K−1 of the light patterns maintains a constant value over the columns in the sub-interval and one of the K patterns varies across the columns in the sub-interval.

5. The system of claim 4, wherein the at least one hardware processor is further programmed to determine a column index c' that is associated with a code corresponding to the K values associated with the pixel.

6. The system of claim 5, wherein the at least one hardware processor is further programmed to:
identify a median value of the K values associated with the pixel;
cluster K−1 of the K values associated with the pixel into a low intensity cluster, and a high intensity cluster;
determine a sub-interval of the at least $2^K-4$ sub-intervals in which column index c' is located based on an order in which the K values were generated, and which of the K values is included in the low intensity cluster; and
determine c' based on the sub-interval and the median value.

7. The system of claim 6, wherein the at least one hardware processor is further programmed to:
  determine a location K within the sub-interval based on the relationship $$\kappa = \frac{I_{med} - I_{min}}{I_{max} - I_{min}}$$

where $I_{med}$ is the median value, $I_{min}$ is a mean of values in the low intensity cluster, and $I_{max}$ is a mean of values in the high intensity cluster; and
  determine c' based on the location K.

8. A method for estimating depths in a scene, the method comprising:
  causing a light source to emit K light patterns toward the scene, wherein each of
  the K light patterns includes at least one trapezoid-shaped wave and is different from each of the other K light patterns, and wherein at least one of the K light patterns includes at least two trapezoid-shaped waves, wherein K>4;
  causing an image sensor comprising a pixel to generate an intensity value during emission of each of the K light patterns such that the pixel is associated with at least K intensity values;
  determine a depth estimate for a portion of the scene imaged by the pixel based on the K intensity values associated with the pixel.

9. The method of claim 8, wherein each of the K light patterns is based on a coding function, and wherein the K light patterns are based on a Hamiltonian cycle of a K-dimensional hypercube.

10. The method of claim 9, further comprising causing the light source to emit a first light pattern of the K light patterns by causing a first plurality of columns of the light source to emit light at a maximum intensity, and causing at least one column adjacent to the first plurality of columns to emit light at a fraction of the maximum intensity.

11. The method of claim 8, wherein the light source comprises a plurality of columns, each of the plurality of columns associated with a column index c, and wherein the plurality of columns is sub-divided into at least $2^K-4$ sub-intervals λ such that within each sub-interval K−1 of the K light patterns maintains a constant value over the columns in the sub-interval and one pattern of the K patterns varies across the columns in the sub-interval.

12. The method of claim 11, further comprising determining a column index c' that is associated with a code corresponding to the K values associated with the pixel.

13. The method of claim 12, further comprising:
  identifying a median value of the K values associated with the pixel;
  clustering K−1 of the K values associated with the pixel into a low intensity cluster, and a high intensity cluster;
  determining a sub-interval of the at least $2^K-4$ sub-intervals in which column index c' is located based on an order in which the K values were generated, and which of the K values is included in the low intensity cluster; and
  determining c' based on the sub-interval and the median value.

14. The method of claim 13, further comprising:
  determining a location K within the sub-interval based on the relationship $$\kappa = \frac{I_{med} - I_{min}}{I_{max} - I_{min}}$$

where $I_{med}$ is the median value, $I_{min}$ is a mean of values in the low intensity cluster, and $I_{max}$ is a mean of values in the high intensity cluster; and
  determining c' based on the location K.

15. A non-transitory computer readable medium containing computer executable instructions that, when executed by a processor, cause the processor to perform a method for estimating depths in a scene, the method comprising:
  causing a light source to emit K light patterns toward the scene, wherein each of the K light patterns includes at least one trapezoid-shaped wave and is different from each of the other K light patterns, and wherein at least one of the K light patterns includes at least two trapezoid-shaped waves, wherein K>4;
  causing an image sensor comprising a pixel to generate an intensity value during emission of each of the K light patterns such that the pixel is associated with at least K intensity values;
  determine a depth estimate for a portion of the scene imaged by the pixel based on the K intensity values associated with the pixel.

16. The non-transitory computer readable medium of claim 15, wherein each of the K light patterns is based on a coding function, and wherein the K light patterns are based on a Hamiltonian cycle of a K-dimensional hypercube.

17. The non-transitory computer readable medium of claim 16, further comprising causing the light source to emit a first light pattern of the K light patterns by causing a first plurality of columns of the light source to emit light at a maximum intensity, and causing at least one column adjacent to the first plurality of columns to emit light at a fraction of the maximum intensity.

18. The non-transitory computer readable medium of claim 15, wherein the light source comprises a plurality of columns, each of the plurality of columns associated with a column index c, and wherein the plurality of columns is sub-divided into at least $2^K-4$ sub-intervals λ such that within each sub-interval K−1 of the K light patterns maintains a constant value over the columns in the sub-interval and one pattern of the K patterns varies across the columns in the sub-interval.

19. The non-transitory computer readable medium of claim 18, wherein the method further comprises determining a column index c' that is associated with a code corresponding to the K values associated with the pixel.

20. The non-transitory computer readable medium of claim 19, wherein the method further comprises:
  identifying a median value of the K values associated with the pixel;
  clustering K−1 of the K values associated with the pixel into a low intensity cluster, and a high intensity cluster;
  determining a sub-interval of the at least $2^K-4$ sub-intervals in which column index c' is located based on an order in which the K values were generated, and which of the K values is included in the low intensity cluster; and
  determining c' based on the sub-interval and the median value.

21. The non-transitory computer readable medium of claim 20, wherein the method further comprises:
  determining a location K within the sub-interval based on the relationship $$\kappa = \frac{I_{med} - I_{min}}{I_{max} - I_{min}}$$

where $I_{med}$ is the median value, $I_{min}$ is a mean of values in the low intensity cluster, and $I_{max}$ is a mean of values in the high intensity cluster; and determining c' based on the location K.

* * * * *

UNITED STATES PATENT AND TRADEMARK OFFICE
CERTIFICATE OF CORRECTION

PATENT NO. : 10,818,023 B2
APPLICATION NO. : 16/112474
DATED : October 27, 2020
INVENTOR(S) : Mohit Gupta Page 1 of 1

It is certified that error appears in the above-identified patent and that said Letters Patent is hereby corrected as shown below:

In the Specification

Column 16, Line 4, "$\lambda$" should be --A--.

Signed and Sealed this
Nineteenth Day of January, 2021

Andrei Iancu
*Director of the United States Patent and Trademark Office*